US012515955B2

(12) United States Patent
Ghimbeu et al.

(10) Patent No.: US 12,515,955 B2
(45) Date of Patent: Jan. 6, 2026

(54) CARBON MATERIAL, USE THEREOF IN BATTERIES, METHOD FOR PRODUCING SAID MATERIAL AND ELECTRODE COMPRISING SAME

(71) Applicants: Centre National de la Recherche Scientifique, Paris (FR); Université de Haute Alsace, Mulhouse (FR); Université de Picardie Jules Verne, Amiens (FR); Université Paul Sabatier Toulouse III, Toulouse (FR)

(72) Inventors: Camélia Ghimbeu, Mulhouse (FR); Adrian Beda, Mulhouse (FR); Pierre-Louis Taberna, Escalquens (FR); Patrice Simon, Toulouse (FR); Mathieu Morcrette, Amiens (FR); François Rabuel, Amiens (FR)

(73) Assignees: CENTRE NATIONAL DE LA RECHERCHE SCIENTIFIQUE (FR); UNIVERSITE DE HAUTE ALSACE (FR); UNIVERSITÉ PAUL SABATIER TOULOUSE III (FR); UNIVERSITÉ DE PICARDIE JULES VERNE (FR)

( * ) Notice: Subject to any disclaimer, the term of this patent is extended or adjusted under 35 U.S.C. 154(b) by 642 days.

(21) Appl. No.: 17/784,374

(22) PCT Filed: Dec. 11, 2020

(86) PCT No.: PCT/EP2020/085847
§ 371 (c)(1),
(2) Date: Jun. 10, 2022

(87) PCT Pub. No.: WO2021/116455
PCT Pub. Date: Jun. 17, 2021

(65) Prior Publication Data
US 2023/0067245 A1 Mar. 2, 2023

(30) Foreign Application Priority Data

Dec. 11, 2019 (FR) ...................................... 1914354

(51) Int. Cl.
C01B 32/05 (2017.01)
(52) U.S. Cl.
CPC .......... C01B 32/05 (2017.08); C01P 2004/32 (2013.01); C01P 2004/61 (2013.01);
(Continued)
(58) Field of Classification Search
CPC .. C01B 32/05; C01P 2004/32; C01P 2004/61; C01P 2006/11; C01P 2006/12;
(Continued)

(56) References Cited

U.S. PATENT DOCUMENTS

2003/0157014 A1* 8/2003 Wang ...................... C01B 32/05
423/445 R
2007/0195488 A1 8/2007 Kim et al.
2017/0155149 A1* 6/2017 Kawaguchi ........... H01M 4/043

FOREIGN PATENT DOCUMENTS

CN 102386384 A 3/2012
CN 103996833 A 8/2014
(Continued)

OTHER PUBLICATIONS

Laine ("The Importance of Active Surface Area in the Carbon-Oxygen Reaction") (Year: 1963).*
(Continued)

Primary Examiner — Anthony J Zimmer
Assistant Examiner — Starfari Teshawn Mcclain
(74) Attorney, Agent, or Firm — Dilworth IP, LLC

(57) ABSTRACT

A carbon material comprising particles of hard, non-porous carbon having a spherical morphology, this material having an interlayer distance d002 of more than 3.6 Å and a total
(Continued)

specific surface area, measured by the BET N2 method, of less than 75 m2/g, and a method for producing said material. The method further comprises a step of mixing an amine catalyst, an aromatic hydroxyl compound and an aldehyde compound.

21 Claims, 12 Drawing Sheets

(52) U.S. Cl.
CPC ....... *C01P 2006/11* (2013.01); *C01P 2006/12* (2013.01); *C01P 2006/40* (2013.01)

(58) Field of Classification Search
CPC .............. C01P 2006/40; C01P 2002/72; C01P 2004/03; H01M 10/0525; H01M 10/054; H01M 4/587; H01M 4/625; Y02E 60/10; Y02E 60/50
See application file for complete search history.

(56) References Cited

FOREIGN PATENT DOCUMENTS

| CN | 105914371 | A | 8/2016 |
|---|---|---|---|
| FR | 3014425 | A1 | 6/2015 |
| JP | 2016-201419 | A | 12/2016 |
| WO | 01/98209 | A1 | 12/2001 |

OTHER PUBLICATIONS

Gimbeu at el "Insights on the Na+ ion storage mechanism in hard carbon: Discrimination between the porosity, surface functional groups and defects," Nano Energy vol. 44, Feb. 2018, pp. 327-335.*
Xiao, Lifen et al., Low-Defect and Low-Porosity Hard Carbon with High Coulombic Efficiency and High Capacity for Practical Sodium Ion Battery Anode, Advanced Energy Materials, 2018, pp. 1-7.
Beda, A., et al., Hard carbons derived from green phenolic resins for Na-ion batteries, Elsevier, ScienceDirect, 2018, pp. 1-10.
Irisarri, E., et al., Optimization of Large Scale Produced Hard Carbon Performance in Na-Ion Batteries: Effect of Precursor, Temperature and Processing Conditions, Journal of The Electrochemical Society, 165 (16), 2018, pp. A4058-A4066.
Maetz, A., et al., Facile and sustainable synthesis of nitrogen-doped polymer and carbon porous spheres, Green Chemistry, 2017, pp. 2266-2274.
Ghimbeu, C., et al., Insights on the Na+ ion storage mechanism in hard carbon: Discrimination between the porosity, surface functional groups and defects, Elsevier, ScienceDirect, 2018, pp. 327-335.
Hasegawa, G., et al., Hard Carbon Anodes for Na-Ion Batteries: Toward a Practical Use, ChemElectroChem, 2015, pp. 1917-1920.
Ghimbeu, C., et al., Catalyst-free soft-template synthesis of ordered mesoporous carbon tailored using phloroglucinol/glyoxylic acid environmentally friendly precursors, Green Chemistry, 2014, pp. 3079-3088.
Tang, H., et al., Porous carbon spheres as anode materials for sodium-ion batteries with high capacity and long cycling ife, Elsevier, Ceramics International, 2017, pp. 4475-4482.
Tang, K., et al., Hollow Carbon Nanospheres with Superior Rate Capability for Sodium-Based Batteries, Advanced Energy Materials, 2012, pp. 873-877.
Wang, M., et al., Synthesis of Novolac-Type Phenolic Resins Using Glucose as the Substitute for Formaldehyde, Journal of Applied Polymer Science, vol. 118, 2010, pp. 1191-1197.
Vali, R., et al., D-Glucose Derived Nanospheric Hard Carbon Electrodes for Room-Temperature Sodium-Ion Batteries, Journal of The Elctrochemical Society, 163, 2016, pp. A1619-A1626.
Li, Y., et al., Pitch-derived amorphous carbon as high performance anode for sodium-ion batteries, Elsevier, Energy Storage Materials, 2016, pp. 139-145.
Office Action received for Chinese Patent Application No. 202080094931.6, mailed on Jul. 19, 2024, 19 pages (11 pages of English Translation and 8 pages of Original Document).
Wanqin, J., et al., "Advances in Materials Chemical Engineering", Chemical Industry Press, Sep. 30, 2007, pp. 350-351.

* cited by examiner

CARBON MATERIAL, USE THEREOF IN BATTERIES, METHOD FOR PRODUCING SAID MATERIAL AND ELECTRODE COMPRISING SAME

FIELD OF THE INVENTION

The invention relates to a carbon material comprising particles of hard, non-porous carbon having a small spherical morphology and the use thereof as a material in electrochemical devices such as electrochemical cells, battery cells, batteries and/or sodium ion accumulators.

BACKGROUND

Hard carbon is a disordered form of carbon (neither graphite nor diamond) that cannot be graphitizable even by heating at very high temperature (3000° C.). It consists of a mixture of zones of randomly stacked carbon atom monolayers and of non-stacked monolayers, having a low degree of graphitization overall. These carbons are generally made by pyrolysis of carbon precursors such as sugars, biomass waste, polymers and phenolic resins. The use of hard carbon as a material in the field of electrochemistry has been studied for many years. Its availability, cost, corrosion resistance and good electronic conductivity make it a very promising material for the manufacture of electrodes for cells, fuel cells and batteries. In particular, this material is promising for the production of sodium ion batteries because it allows the intercalation of sodium ions in a reversible manner. Thus, A. Beda et al., "Hard carbons derived from green phenolic resins for Na-ion batteries," Carbon, vol. 139, p. 248-257, November 2018 describes a carbon material that is a hard carbon obtained by polymerization of a polyphenol, phloroglucinol, and an aldehyde, glyoxylic acid. The three-step process makes it possible to obtain a material made up of particles of heterogeneous shape, which, after grinding, can be used in sodium ion batteries.

Maetz et al., "Facile and Sustainable synthesis of nitrogen-doped polymer and carbon porous spheres," Green Chem., 2017, vol. 19, p. 2266-2274) describes the synthesis of porous carbon spheres by polymerization of phloroglucinol and glyoxylic acid using Triethylenediamine (TEDA) as reaction catalyst. The synthesis process does not require a thermopolymerization step. The material obtained is not suitable for use in electrodes due in particular to its high porosity.

However, for a material to be able to be used for electrodes, and in particular sodium ion-type electrodes, the material must have particular physicochemical characteristics in order to be effective It is in particular necessary for the material to allow a simple and inexpensive manufacture of the electrodes and to allow rechargeable cells, batteries or accumulators, in particular of the sodium-ion type, to be obtained that have an irreversible and reversible capacity, both of which are acceptable.

SUMMARY OF THE INVENTION

To this end, the object of the invention is a carbon material, comprising, consisting essentially of, or consisting of, hard, non-porous carbon particles having a spherical morphology, this material having an interlayer distance $d_{002}$ of between 3.50 Å and 4.30 Å, and a total specific surface area, measured by the BET N2 method, of less than 75 m$^2$/g.

DESCRIPTION OF THE INVENTION

Owing to these characteristics, such a material has a substantial ease of use compared to existing carbon materials because this material is simple to obtain, from low-polluting compounds, and its particular and homogeneous morphology ensures great reproducibility during the manufacture of the electrode. In addition, its manufacturing method, which is also an object of the invention, allows a homogeneous powder to be obtained directly without grinding steps, and particularly industrial and/or mechanical grinding, of the material resulting from the carbonization. In fact, the hard carbon resulting from conventional manufacturing methods appears, after the carbonization step, in the form of a mass or an agglomerate of very hard pieces that must be reduced to powder for use thereof in electrodes. This grinding step, when carried out at an industrial level, must necessarily be done by machine. The use of such machines, such as ball mills, can degrade hard carbon by increasing its structural defects and/or by increasing the presence of functional oxygenated groups ($CO_x$). The carbon material according to the invention, which does not require such an industrial grinding step for its manufacture, therefore preserves its intrinsic qualities and can be used directly. Thus, according to a preferred aspect of the invention, the material is a powder, advantageously a powder whose average apparent grain size is less than 10 μm, and preferably varies between 1 and 10 μm.

The hard carbon according to the invention is a carbon of the so-called "disordered" type and which cannot be graphitized (ordered structure), even when heated to high temperature (1 g at more than 2000° C. for 1 hour under argon). The structure of hard carbons is disordered when compared to crystal structures that are highly ordered (e.g., graphite-like) or weakly disordered (graphitizable carbon, or "soft" carbon). However, even these hard carbons have more ordered graphitic-like zones (i.e. stacked graphene planes), which may explain some of their electrochemical properties. An interlayer distance $d_{002}$ greater than 3.5 Å is generally a characteristic of a hard carbon, since the distance $d_{002}$ of graphite is 3.34 Å and that of soft carbons varies from about 3.45 to 3.6 Å. Beyond an interlayer distance $d_{002}$ of 4.3, the carbon is too disorganized and is generally no longer suitable for use as a constituent material of an electrode.

The particles of the carbon material according to the invention have a spherical morphology. "Spherical morphology" means that these particles have an essentially spherical shape. For example, the distance between the surface and the center of gravity of the particle (radius) must not vary by more than 10%, preferably 5%.

These spheres are most often microspheres, that is to say, their diameters are essentially of the order of 0.1 to 100 microns, but other dimensions could be envisaged.

Preferably, the interlayer distance, which is preferably measured by X-ray diffraction (XRD; see below), is greater than 3.6 Å. According to a preferential aspect, this distance is between 3.70 Å and 4.00 Å, advantageously is chosen from a range of from 3.75 Å to 3.90 Å, and even more preferentially from a range of from 3.80 Å to 3.90 Å. The very particularly preferred interlayer distance varies from 3.70 Å to 3.80 Å.

The total specific surface area of the material according to the invention, measured by the BET N2 method, is preferably from 1 to 50 m$^2$/g, in particular from 1 to 10 m$^2$/g, and even more preferably from 1 to 3.5 m$^2$/g.

According to a preferred aspect, the total specific surface area, measured by the BET $CO_2$ method, of the material according to the invention is from 1 to 100 m$^2$/g, preferably from 1 to 60 m$^2$/g, in particular from 1 to 21 m$^2$/g, and very preferably from 1 to 10 m$^2$/g.

A particularly preferred feature of the invention is that the carbon material has a tapped density that is particularly high compared to other known carbon materials. In fact, the material can have a tapped density similar to other materials used industrially, in particular without a prior grinding step, which step generally tends to degrade the properties of the material. Thus, the material according to the invention advantageously has a tapped density greater than 0.7 g/cm$^3$, for example chosen from the range of 0.72 g/cm$^3$ to 1.1 g/cm$^3$, preferably greater than 0.84 g/cm$^3$. The measurement procedure, which is a standard method, is described below.

The hard carbon particles essentially have a size between 0 μm and 15 μm, preferably between 0 μm and 10 μm. According to one aspect of the invention, the particle distribution is homogeneous and the mean D50 value of the particles can range from 0.4 μm to 5 μm, preferably from 1.5 μm to 4.5 μm or from 3.5 μm to 4.5 μm, especially about 3.8 μm. According to another aspect of the invention, which is preferred, the particle size distribution is not homogeneous, but comprises at least 2 distinct particle peaks. A predominant first peak comprises small particle sizes (usually around 4±0.5 μm) with a broader peak toward larger sizes (usually around 7±0.5). The average size of particles constituting these peaks is for example respectively from 2.5 to 4 μm and from 7.1 to 7.7 μm. Preferably, the ratio of these sizes has a ratio of about 2.8±20. Such a particle distribution is particularly advantageous because it allows the density to be increased.

The material according to the invention advantageously has a low active surface area (ASA), preferably less than 12 m$^2$/g, and even more preferably less than 5 m$^2$/g, and even less than 3 m$^2$/g and even 1 m$^2$/g.

Finally, the material according to the invention advantageously has a very low oxygen-based functional group content, in particular less than 0.5 mmol/g, preferably less than 0.1 mmol/g, in particular less than 0.05 mmol/g.

The material described below and referenced under the name ABE 1300, ABE 1400, ABE 1500 or ABE 1600, is a particularly preferred material according to the invention. In particular, ABE 1500° C. is particularly suitable for use as an electrode and more particularly as an anode in sodium ion batteries. Another aspect of the invention is a method for manufacturing a non-porous carbon material comprising at least the following steps:

a. a step of mixing, in the presence of a solvent, in particular an aqueous solvent, at least
   an amine catalyst preferably chosen from the group consisting of triethylenediamine (TEDA), HMTA (hexamethylenetetramine quinuclidine, triethylamine (TEA) and mixtures thereof; advantageously, said catalyst is TEDA, and even more advantageously, the catalyst is HMTA;
   a source of carbon (or capable of forming carbon after pyrolysis) such as an aromatic hydroxyl compound chosen in particular from the group consisting of phenol, resorcinol and phloroglucinol, catechin, pyrogallol, hydroxyquinol, gallic acid, polyphenols, such as tannins, and mixtures thereof; advantageously, said aromatic hydroxyl compound is phloroglucinol, or a condensed tannin; and
   an aldehyde compound, preferably selected from the group consisting of glyoxal, formaldehyde, acetaldehyde, a keto acid, glyoxylic acid, pyruvic acid, 2-methyl-3-oxopropanoic acid, and mixtures thereof; preferably, the aldehyde compound is glyoxylic acid;

b. a step of maturation of the mixture obtained at the end of step a), preferably at a temperature comprised between 2° and 35° C., for example for a period comprised between 0.5 and 5 days, making it possible to obtain a solid phase comprising spheres of phenolic resin and a liquid phase;

c. a step of controlled separation of said solid phase from said liquid phase, preferably without centrifugation;

d. a step of polymerization and/or drying, optionally thermal, of said solid phase for a period of 1 to 48 hours resulting in the formation of a dry phenolic resin; and e. a step of carbonizing said dry phenolic resin, preferably in the presence of a flow of inert gas at a temperature preferably between 1200° C. and 2000° C. to obtain a non-porous carbon material; and f. optionally a step of recovering said non-porous carbon material.

The solvent is advantageously a polar protic solvent, which can be chosen from water and/or alcohols (such as ethanol, propanol and butanol), alone or as a mixture, although an unmixed solvent (i.e. pure at least at 95% v/v), for example ethanol, is preferred.

The solvent is preferably an aqueous solvent, more particularly water, pure or simply potable (and therefore comprising certain salts). Preferably the solvent is water, and more particularly pure water.

The amount of solvent, in particular of water, relative to the phenolic precursor (1 g) can optionally be chosen in the range from 10 to 200 g, preferably from 20 to 60 g (or a water:precursor mass ratio of 20:1 to 60:1).

The amount of crosslinking agent (aldehyde) relative to the phenolic precursor (1 g) can optionally be chosen from the range of 0.5 to 4 g, preferably from 0.8 to 1.8 g (that is to say, from 0.88 to 1.8 in mass percentage relative to the total mass of precursor (i.e. a crosslinking agent:precursor mass ratio ranging from 0.88:1 to 1.8:1).

The quantity of catalyst (amine agent) with respect to the phenolic precursor can optionally be chosen within the range of 0.1 to 0.9 g, preferably from 0.3 to 0.7 g.

The aromatic hydroxyl compound can also be chosen from compounds with a benzene ring comprising a hydroxy group. The benzene ring may be unsubstituted other than by the hydroxy group ("phenol" type compound), or substituted by one or more groups, such as the following: hydrocarbon, halogen, nitro, amino and/or alkoxy group. Such compounds include phenol, halophenols, aminophenols, hydrocarbylphenols ("hydrocarbyl" including, for example, linear branched or cyclic groups of the alkyl, alkenyl, or alkynyl type containing for example from 1 to 6 carbons, optionally substituted by one or more oxygen or nitrogen atoms, naphthols, nitrophenols, hydroxyanisoles, hydroxybenzoic acids, phenols substituted by one or more fatty acid esters one or more polyalkyleneoxy, phenols containing an azo bond (p-hydroxyazobenzene), phenolsulfonic acids (p-phenolsulfonic acid). These compounds include fluorophenols, chlorophenols, bromophenols, and iodophenols, 2-, 3-, and 4-aminophenols, 3,5- and 2,5-diaminophenols; 2-, 3-, and 4-nitrophenols, 2,5- and 3,5-dinitrophenol; cresols, methylphenols or hydroxytoluenes, xylenols, ethylphenols, n-propylphenols, isopropylphenols, butylphenols, hexylphenols, octylphenols, nonylphenols (, phenylphenols, hydroxycinnamic acids; hydroxyanisoles such as 2-methoxyphenol, 3-methoxyphenol, 4-methoxyphenol, 3-t-butyl-4-hydroxyanisole; 2-hydroxybenzoic, 3-hydroxybenzoic, 4-hydroxybenzoic acids, and esters thereof (methyl salicylate and ethyl-4-hydroxybenzoate).

Examples of phenolic compounds with two hydroxy groups are: catechol, resorcinol, hydroquinone, hydrocarbyl-bis-phenols (such as bis-phenol A, methylenebisphenol, and 4,4'-dihydroxystilbene), 4,4'-dihydroxybiphenyl (4,4'-biphenol), halo-diphenols (2-haloresorcinols, 3-haloresorcinols, and 4-haloresorcinols, where halo is fluoro, chloro, bromo, or iodo), amino-diphenols (2-aminoresorcinol, 3-aminoresorcinol, and 4-aminoresorcinol), hydrocarbyl-diphenols (2,6-dihydroxytoluene, 2-methylresorcinol; 2,3-, 2,4-, 2,5-, and 3,5-dihydroxytoluene, 1-ethyl-2,6-dihydroxybenzene, caffeic or chlorogenic acid), nitro-diphenols (2- or 4-nitroresorcinol), dihydroxyanisoles (3,5-, 2,3-, 2,5-, or 2,6-dihydroxyanisole, vanillin), dihydroxybenzoic acids (3,5-, 2,3-, 2,5-, or 2,6-dihydroxybenzoic acids), and esters thereof, vanillic acid, phenolphthalein.

Examples of compounds with three hydroxy groups are: phloroglucinol (1,3,5-trihydroxybenzene), pyrogallol (1,2,3-trihydroxybenzene), 1,2,4-trihydroxybenzene, 5-chloro-1,2,4-trihydroxybenzene, resveratrol (trans-3,5,4-trihydroxystilbene), hydrocarbyl-triphenols (2,4,6-trihydroxytoluene, methylphloroglucinol, and 3,4,5-trihydroxytoluene), halo-triphenols (5-chloro-1,2,4-trihydroxybenzene), carboxy-triphenols (3,4,5-trihydroxybenzoic and 2,4,6-trihydroxybenzoic acids), nitro-triphenols (2,4,6-trihydroxynitrobenzene), and phenol-formaldehyde resoles or the resins of the novolak type.

Examples of compounds comprising a multitude of hydroxy groups are the following: tannins (incl. tannic acid), ellagotannins, gallotannins, phenol polymers (poly-(4-hydroxystyrene), resole phenol-formaldehyde or resins of the novolak type containing at least four phenol groups (usually MW 500-5000), quercetin, ellagic acid and tetraphenol ethane. Tannins are a group of molecules of natural origin from plants and which are readily available. These are high molecular weight polyphenols, generally ranging from 500 to 20,000 g/mol. They can be characterized in particular by the presence of at least 12-OH hydroxyl groups and 5 phenyl groups. Among tannins, we distinguish hydrolysable tannins, phlorotannins and condensed tannins. Hydrolysable tannins (pyrogallol) contain glucose residues that are esterified and no longer contain-OH groups. Phlorotannins contain phloroglucinol groups and are usually extracted from brown algae. Condensed tannins (catechol and phlobotannins), also called proanthocyanidins, which contain flavan-3-ol groups. Condensed tannins and phlorotannins are the most suitable tannins for use in the method according to the invention, and in particular condensed tannins such as mimosa or cachou tannins. To distinguish condensed tannins from hydrolysable tannins, their FT-IR spectra may be performed. The hydrolyzed tannins exhibit a —C═O peak at 1730 cm$^{-1}$, and possibly a —CO° peak at 1250 cm$^{-1}$, which peaks are absent, or less pronounced, for the condensed tannins.

As indicated previously, phloroglucinol and condensed tannins, in particular those of mimosa and cachou, are particularly preferred.

The compound can also be chosen from aldehyde, dialdehyde and polyaldehyde compounds. They can be represented by the following formulas:

where R is a linear, branched, or cyclic group of the alkyl, alkenyl, or alkynyl type containing at least 1, 2, 3, 4, 5, 6, 7, or 8 carbon atoms. Such examples comprise: acetaldehyde, propanal (propionaldehyde), butanal (butyraldehyde), pentanal (valeraldehyde), hexanal, crotonaldehyde, acrolein, benzaldehyde, and furfural;

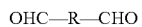

where R is a covalent bond (glyoxal) or branched, linear, or cyclic group of the alkyl, alkenyl, or alkynyl type containing at least 1, 2, 3, 4, 5, 6, 7, or 8 carbon atoms. Such examples comprise: glyoxal, malondialdehyde, succinaldehyde, glutaraldehyde, adipaldehyde, pimelaldehyde, suberaldehyde, sebacaldehyde, cyclopentanedialdehyde, terephthaldehyde, and furfuraldehyde. According to a variant, one of the hydrogens of the aldehyde compound can be replaced by a hydrocarbon group, for example to form an aldehyde-ketone dione, for example methylglyoxal or 1,3-butanedione.

An advantageous variant of the aldehyde compound to be used in the method of the invention comprises the use as, or among, the aldehydes described above, of at least one organic compound comprising both an acid function and an aldehyde function. Mention may thus be made of organic compounds comprising both an acid function and an aldehyde function of the following formula ("ketoacids"):

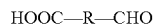

where R is present or absent, and if present, represents a saturated, linear, branched, or cyclic hydrocarbon chain, preferably C1-C20, optionally substituted, optionally having one or more unsaturations, optionally including one or more heteroatoms and/or functions.

In the method according to the invention, the aldehyde acts as the main crosslinking agent; it may therefore be capable of forming a phenolic resin by using the phenol units of the carbon precursor compounds.

The term "substituted" designates one or more substitutions of a hydrogen atom by a halogen atom or by a group such, as for example: alkyl, haloalkyl, cycloalkyl, alkenyl, alkynyl, aryl, a heterocyclic group, such as a heterocycloalkyl, a heteroaryl, or by one or more side functions, such as for example amine, cyano, acid, ester, amide functions, etc., without any particular limitation.

The term "function" designates a chemical group modifying at least one chemical property, such as for example an amide, ester, oxo function, etc., without any particular limitation.

According to a variant, R is present or absent, and if present, represents a linear, branched or cyclic alkyl chain, preferably C1-C20, optionally substituted. Among the alkyl groups, mention may be made of: methyl, ethyl, propyl, and butyl, or even pentyl, hexyl, octyl, nonyl, decyl, dodecyl, hexadecyl, octadecyl, isopropyl, iso-butyl, sec-butyl, tert-butyl, 2-ethylhexyl, 2-methylbutyl, 2-methylpentyl, 1-methylpentyl and 3-methylheptyl.

Among these compounds, mention may be made of alpha-ketoacids, or 2-oxoacids (pyruvic acid); beta-ketoacids or 3-oxoacids (acetylacetic acid); gamma-ketoacids or 4-oxoacids (levulinic acid).

Examples of this type of compound include:
Glyoxylic acid: HOOC—CHO;
Pyruvic Acid: HOOC—CH2-CHO; and
2-Methyl-3-oxopropanoic acid.

The step of mixing the components can comprise a preliminary step of dissolving the carbon source, and in particular the hydroxylated aromatic compounds, and/then the aldehyde in the solvent, these steps being carried out with stirring. The dissolution time can vary from a few minutes (e.g. 5 minutes) to several hours (e.g. 5 hours). A period of 0.5 to 1 hour(s) may be sufficient. The addition of the catalyst can then be carried out with stirring as well. The stirring period is generally shorter. In general, it is chosen from 1 minute to 1 hour, in particular from 5 to 15 minutes. It should be noted that the term "catalyst" is used to designate the main function of the amine compound, which is to catalyze the crosslinking reaction between the carbon precursor and the main crosslinking agent, for example the aldehyde. However, this amino compound can also, but to a lesser degree, participate in crosslinking and thus be considered a secondary crosslinking agent.

Step b) of maturation of the mixture obtained at the end of these steps can be carried out at ambient temperature (approx. 20 to 25° C.), which is an advantage in terms of costs. Preferably, the maturation reaction takes place at rest and not with stirring. It may also be advantageous to work in a controlled atmosphere, and in particular to close the container containing the mixture, or to work under an inert gas, in order to prevent evaporation of the solvent. The maturation step advantageously lasts more than 24 hours. A maturation step of 36 to 72 hours, and more particularly of 44 to 52 hours (for example 48 hours), is preferred.

Step c) of separation of the solid phase, where resin, and the liquid phase is preferably carried out by gentle methods, for example simple pouring (or suction) of the liquid may suffice. The solid phase remains attached to the walls of the container. Advantageously, it may be recommended not to apply centrifugation means for particles of sufficient size (for example, more than 1 micron). Thus, according to a particularly preferred aspect of the invention, it is recommended not to apply a high force to the resin, such as high-speed centrifugation, for example beyond 10 to 15 thousand rpm. Step d), which is a polymerization and/or drying step, is preferably a thermal step. This thermal step is preferably mild and can take place by heating to a temperature ranging from 70° C. to 150° C. Advantageously, this temperature is chosen within a range extending from 75° C. to 85° C., in particular around 80° C. The thermal step can be carried out at rest and is preferably chosen to reduce the cost and the steps of the synthesis. The heating time can be 6 to 24 hours, and preferably 8 to 16 hours, for example about 10 or 12 hours.

During drying/polymerization at room temperature, the drying time can vary from 10 to 48 hours; for example, a period of 20 to 24 hours yields satisfactory results.

At the end of this step, the dry resin thus obtained is subjected to a carbonization step. "Carbonization" refers to a pyrolysis or thermolysis step. The carbonization temperature can advantageously be chosen in the range of 1300° C. to 2000° C. This carbonization preferably takes place in an oxygen-free atmosphere, and preferably under argon. The temperature variation can advantageously be from 1° C./min to 15° C./min, preferably around 5° C./min. Using a temperature of approximately 1500° C., for example ±20%, makes it possible to obtain a material that is particularly suitable for use as an electrode, and more particularly as an anode in sodium ion batteries.

Once the carbonization step is completed, the carbon material is obtained. It is usually in the form of a powder and can be picked up by simple scooping. Such a powder can be used directly in the manufacture of electrodes for a device, in particular an electrochemical device, without having to be subjected to a substantial grinding step as is usually done.

Another object according to the invention is therefore a carbon material obtained or obtainable by the method according to the invention.

A carbon material according to the invention can advantageously be used in the manufacture of an electrode or of a material for an electrode, preferably an electrode for a rechargeable battery (or battery cell), in particular for sodium-ion, lithium-ion, potassium-ion or Li—S. It can also be used as an additive and combined with one or more other materials in a device, and in particular an electrochemical device. Such a use, as well as such an electrode, are other objects of the invention.

According to a preferred embodiment of the invention, the electrode has a porosity after calendering (and optionally pelletizing) of less than 65%, preferably less than 55%, advantageously less than 48% and even more preferably less than 44%. This porosity can therefore be from 30% to 65%, preferably from 35% to 55%, advantageously from 35% to 50%.

According to a preferred embodiment of the invention, the electrode, when used in a sodium-in half-cell (Na cathode), has a low irreversible capacity, and in particular less than 14%, preferably less than 12% and advantageously less than 9%.

Particularly preferably, this capacity reaches approximately 8%.

According to a preferred embodiment of the invention, the electrode, when used in a complete sodium-ion cell (NVPF cathode), has a high specific capacity, which can range from 100 mAh·g$^{-1}$ to 140 mAh·g$^{-1}$, which can be equal to 125 mAh·g$^{-1}$.

Thus, an electrode according to the invention comprises the carbon material as described above. It can advantageously comprise one or more materials, such as a conductive additive (for example, carbon black) and/or a binder (for example, a polymer such as PolyVinyliDene Fluoride, PVDF). According to a variant of the invention, no conductive additive is present. Such an electrode may contain a majority carbon material according to the invention, in particular more than 80% by mass, preferably more than 90%, for example approximately 97% carbon material. This quantity is therefore advantageously from 80% to 99%, preferably from 85% to 98%, for example from 88% to 94%. The amount of conductor can vary from 0% to 10%, preferably from 2% to 5%. The amount of binder can vary from 1% to 10%, preferably from 2% to 5%. Preferably, the manufacture of such an electrode optionally comprises mixing its constituent elements, and advantageously a step of calendering the material or the mixture to obtain an electrode according to the invention. Such a manufacturing method is also an object of the invention.

Another object of the invention is a battery, an accumulator or a battery cell, optionally rechargeable, or an electrochemical device comprising either the carbon material according to the invention or an electrode according to the invention.

BRIEF DESCRIPTION OF THE FIGURES

The invention will be better understood using the embodiments of the invention and the appended drawings, in which.

EXAMPLES

Example 1: Syntheses of Carbon Materials According to the Invention 4.1 g of phloroglucinol and 3.6 g of glyoxylic acid were dissolved in 200 ml (g) of water with mechanical stirring (~30 min-1 h) at ambient temperature (25° C.) in a flask. Then, 1.8 g of triethylenediamine (TEDA) was added to this mixture and stirred for about 5-10 min until completely dissolved. The addition of TEDA as a crosslinking agent/catalyst causes the formation of a turbid solution of phenolic resin spheres. The mixture is left to stand for an aging time of 24 hours. The spheres increase in size and weight and settle on the bottom of the flask. Two phases are observed: a solid phase (composed of polymer spheres) and a liquid phase. The latter is removed and the solid phase recovered (without centrifugation, by simple pouring) and dried in an oven at 80° C. for around 12 hours to evaporate the water and to better crosslink the resin spheres. A pyrolysis step was then carried out in an inert atmosphere (Ar), by heating 6.5 g of the obtained resin with a heating rate of 5° C./min up to 1300° C., 1400° C., 1500° C. or 1600° C.; once the desired temperature has been reached, a one-hour (1 hour) plateau is done, then a natural cooling step is carried out. The hard carbon is thus obtained (~2.5 g) and subsequently used without the need for a grinding step to standardize the particle size.

The obtained materials are called ABE 1300, ABE 1400, ABE 1500 and ABE 1600.

It is noted that the ABE 1300 hard carbon was synthesized in larger quantities (30 g) and that this change of scale did not produce any notable change in the structure or in the morphology of the hard carbon thus obtained.

Figure 20:
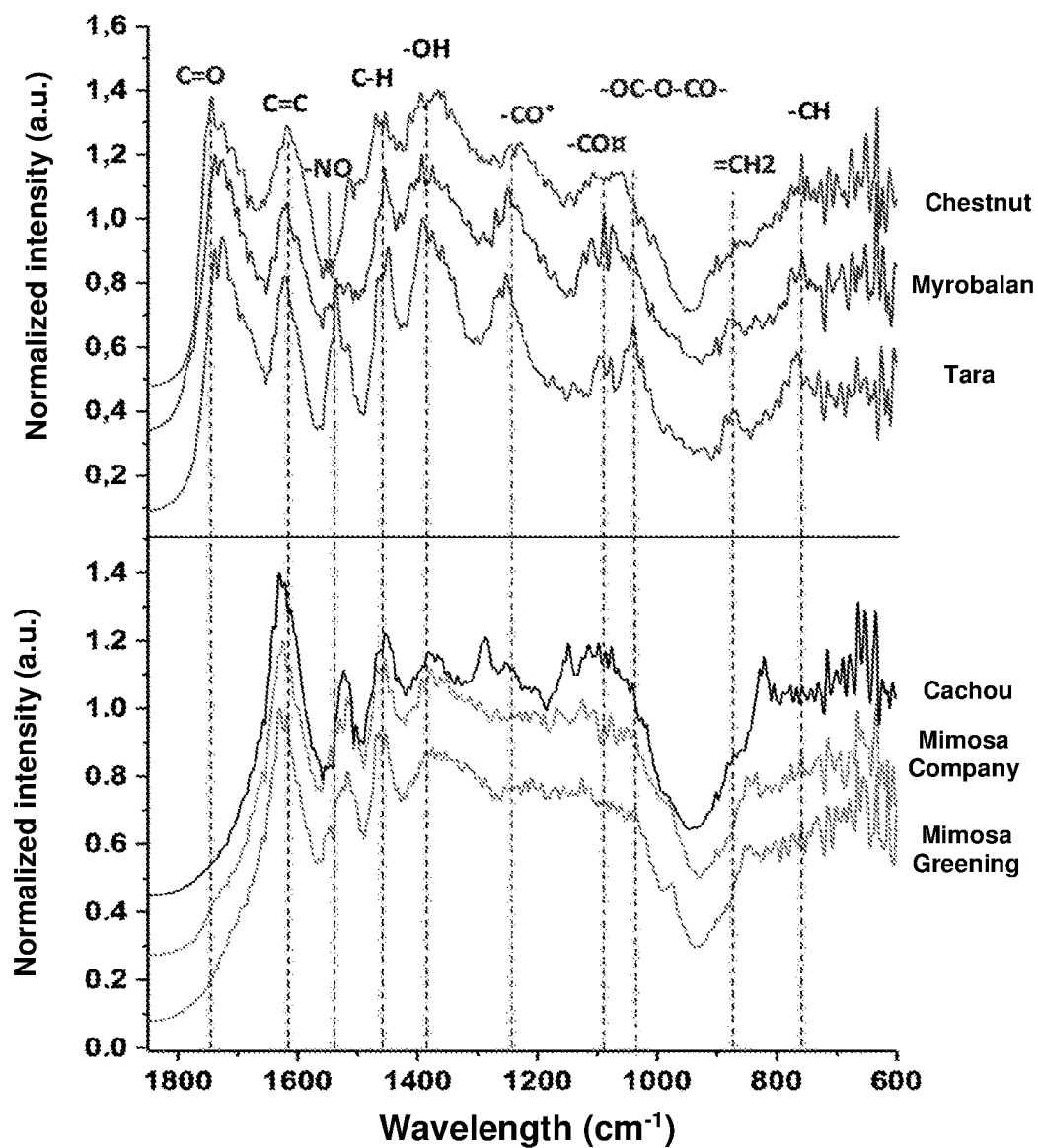
FIG. 20 shows the FT-IR spectra of different hydrolysable tannins (chestnut, myrobalan, tara) measured on a Jasco FT/IR-4100 spectrophotometer, using a "Jasco Spectra Manager" management program and a resolution at 0.4 cm$^{-1}$.

Five other materials according to the invention were synthesized with condensed tannins of mimosa and cachou as precursors. The spectra in FIG. 20 highlight the structural differences between condensed tannins and hydrolysable tannins. Mimosa-G (MG) and Cachou (C) materials were purchased from GREEN'ING (France), while Mimosa-C (MC) material was obtained from Mimosa Extract Company Ltd.

| Aromatic hydroxyl material | Tannin type | Constituents | Main structural unit |
|---|---|---|---|
| Mimosa-C (MC) (*Acacia mearnsii*) | Condensed | 66% condensed tannins | Tannin |

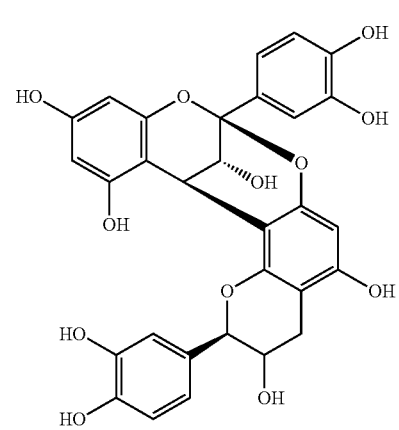 [SMILES: Oc1cc(O)c2c(c1)O[C@@]1(c3ccc(O)c(O)c3)Oc3cc(O)c4c(c3[C@@H]2[C@H]1O)O[C@H](c1ccc(O)c(O)c1)C(O)C4]

-continued

| Aromatic hydroxyl material | Tannin type | Constituents | Main structural unit |
|---|---|---|---|
| Mimosa-G (MG) (*Acacia mearnsii*) | Condensed | 60 to 65% condensed tannins | Tannin |
| Cachou (C) (*Acacia catechu*) | Condensed | Condensed tannins + flavonols (quercitrin) | Quercitrin |

8 g of precursor, i.e. Mimosa-G, Mimosa-C or Cachou, and 9.6 g of glyoxylic acid were dissolved in 320 mL (g) of water with mechanical stirring (~30 min) at ambient temperature (25° C.) in a flask. The reaction between the phenolic (hydroxylated) precursor and the aldehyde (cross-linking agent) makes it possible to obtain a phenolic resin. Then, 4,992 g of hexamethylenetetramine (HMTA) was added to this mixture and stirred for about 5-10 min until completely dissolved. The addition of HMTA as a catalyst causes the formation of a turbid solution of phenolic resin spheres. The mixture is left to stand for an aging time of 48 h. The spheres increase in size and weight and settle on the bottom of the flask. Two phases are observed: a solid phase (composed of polymer spheres) and a liquid phase (composed of the solvent and the rest of the residual organic products). The latter is removed and the solid phase is recovered (without centrifugation), by simple pouring for syntheses using mimosa tannins as precursors. For the cachou tannin, centrifugation was necessary due to the small size of the particles (<1 μm). The solid phase was dried at 25° C., then in an oven at 80° C. for about 12 hours to evaporate the water and to better crosslink the resin spheres. A pyrolysis step was then carried out in an inert atmosphere (Ar), by heating ~7 g of the obtained resin with a heating rate of 5° C./min up to 1500° C.; once the desired temperature has been reached, a one-hour (1 hour) plateau is done, then a natural cooling step is carried out. The hard carbon is thus obtained (~2.6 g), and it is ground manually.

The carbons are called MG-00-1500 (from Mimosa-G), MC-00-1500 (from Mimosa-C) or C-00-1500 (from Cachou).

For the Mimosa G precursor, two syntheses with a higher quantity of glyoxylic acid (14.4 g) were carried out and the obtained polymer was pyrolyzed at 1500 and 1600° C. (sample names: MG-00-EG-1500 and MG-00-EG-1600).

Example 2: Characterization of New Carbon Materials According to the Invention and Comparison with Known Carbon Materials 1) Physicochemical Characterizations $N_2$ and $CO_2$ Adsorption The textural properties (porosity, specific surface area) of the hard carbons according to the invention were studied by the gas sorption technique with a Micromeritics ASAP 2420 device (Micromeritics France S.A.R.L., Merignac, France 33700) using nitrogen ($N_2$) as adsorbent at 77K and with a Micromeritics ASAP 2020 using $CO_2$ as adsorbent at 273K. Before the analysis, the materials were degassed at 300° C. for 12 h under vacuum on the degassing door to eliminate water molecules, and a second degassing was then carried out for an additional 2 h on the analysis door to eliminate the filling gas. A mass of between 150 and 300 mg was employed. The BET (Brunauer, Emmett and Teller) specific surface area was calculated in the relative pressure range of 0.05-0.3.

X-Ray Diffraction (XRD)

Diffraction data collection is provided by a Bruker D8 Advance A25 diffractometer with theta/theta geometry (goniometer radius: 280 mm), with Cu anode. The machine is equipped with an ultra-fast LynxEye XE-T high-resolution 1D detector with energy discrimination (<380 eV, Cu Ka 1.2). A motorized anti-diffusion knife for effective suppression of low-angle air diffusion is present. The samples are prepared in a standard poly(methyl methacrylate)-(PMMA) sample holder by making a pyramid of powder that is flattened using a glass slide. The acquisition conditions were as follows: angular range 10-90° 2theta, no counting: 0.01°, counting time per step: 0.5 s. The total acquisition time was 1 h08. During this acquisition, the sample is rotated at 5 rpm. The DIFFRAC.SUITE, DIFFRAC.EVA software ensures the exploitation of the diffractograms and the calculation of the interlayer distance d (hkl) (distance between two consecutive planes of the same indices (hkl)) is obtained by simple application of Bragg's law ($2d(hkl) \sin\theta = n\lambda$), where n is an integer (in the case of this work, n=1), $\lambda$ is the wavelength, and $\theta$ is the angle of incidence of the X-ray beam on the plane in index diffraction condition (hkl).

SEM (Scanning Electron Microscopy)

The morphology of the carbon material was analyzed with an FEI Quanta 400 Scanning Electron Microscope instrument, high-resolution low-vacuum field emission gun (FEG). The samples were analyzed with a resolution between 1 mm and 10 μm and a magnification up to 10,000×. ImageJ software was used to determine the average particle size. Several images were analyzed and approximately 700 to 1000 particles counted in order to produce a particle size distribution histogram.

TPD-MS (Temperature Programmed Desorption Coupled with Mass Spectrometry)

Temperature-programmed desorption coupled with mass spectrometry (TPD-MS) is an analysis method allowing the study of structural changes in the mass of a material subjected to a temperature-controlled variation. More specifically, TPD-MS measures the desorption rate of molecules as a function of temperature, providing valuable information regarding desorption kinetics, surface concentrations, adsorption sites, etc. With regard to carbon materials, TPD-MS is mainly used to identify oxygenated surface functions, functions which, on decomposing, release CO, $CO_2$, $H_2O$ and $H_2$ at the specific thermal stability temperature of the corresponding functional group. The thermodesorption measurements were carried out using a "homemade" assembly operating under vacuum, equipped with a mass spectrometer (maximum pressure 10-4 Torr).

Before performing the analyses, the mass spectrometer is calibrated with the following gases: $H_2$ (m/z=2), $H_2O$ (m/z=18), CO (m/z=28), $N_2$ (m/z=28), $O_2$ (m/z=32) and $CO_2$ (m/z=44).

About 15-60 mg HC is placed in a quartz boat, then in an oven and degassed for 12 hours under secondary vacuum in order to eliminate the physisorbed water. The TPD-MS is carried out up to 950° C. (with a heating rate of 5° C./min followed by a one-hour plateau), and the released gaseous phase is analyzed quantitatively, throughout the duration of the analysis, by the mass spectrometer.

Another important parameter that can be determined by TPD-MS is the active surface area (ASA).

The active surface of a carbon material corresponds to all the different types of defects present in the carbon: stacking faults, single and multiple vacancies, as well as dislocations. The presence of such active sites is important because they can interact with other species (i.e. $Li^+$, $Na^+$). The ASA consists in carrying out an oxygen chemisorption followed by a TPD-MS measurement. After a first TPD-MS measurement, the vacuum sample is brought into contact with oxygen at 300° C. (oxygen pressure: 66.5 Pa), which is chemisorbed for 10 hours, leading to the formation of oxygenated complexes on the surface of the material. After these 10 hours, the oxygen is eliminated from the system and a second TPD-MS is carried out (up to 950° C. with a heating rate of 10° C./min), and the oxygenated groups formed are decomposed into CO and $CO_2$, their amounts then being determined by mass spectrometry. Finally, the ASA value is calculated by taking into account the number of moles of each of the desorbed gases, considering that the surface of an active site of the carbon material that adsorbs an atom of oxygen is 0.083 $nm^2$.

Tapped Density

This value is measured using a jolting volumeter, such as the STAV Il from J. Engelsmann, Ludwigshafen (DE). The procedure is as follows:

Addition of approximately 2 g of material in a 10 mL graduated cylinder

Initial volume measurement (bulk density)

Launching of 12,000 shots (3 cycles of 4,000 shots) by measuring the volume at each end of the cycle (final tapped density at 12,000 shots).

To distinguish new materials from known ones, the properties of known materials were also studied and measured. These known carbons are:

Commercial hard carbon reference PAC2* (AEKYUNG PETROCHEMICAL, K, South Korea);

Hard carbon PR 600 obtained according to the method described in Maetz et al. Green Chemistry 19 (2017) p. 2266;

Hard carbon PR 1200 and 1500 described in E. Irisarri et al. (*Journal of The Electrochemical Society,* 165 (16) A4058-A4066 (2018))

HC-water hard carbon obtained according to the method described in Beda et al., Carbon 139 (2018) 248-257, with water as solvent (see table 1, row 3).

Figure 1:
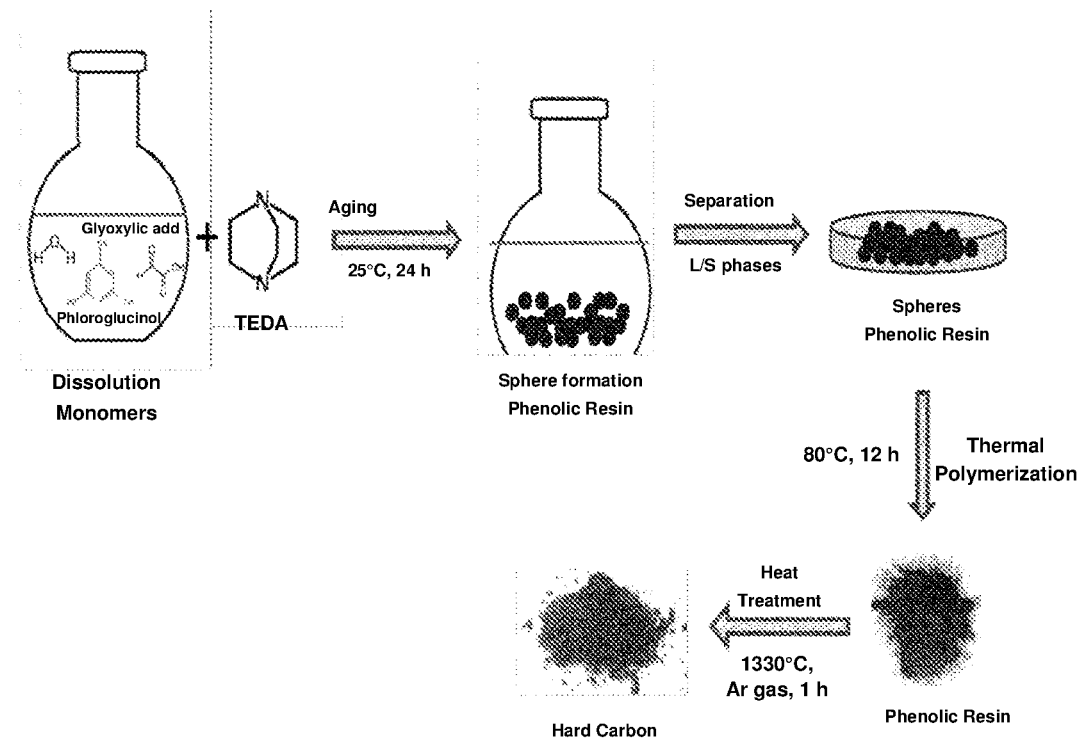
FIG. 1 is a diagram of a method according to the invention for manufacturing a carbon according to the invention.
Figure 2:
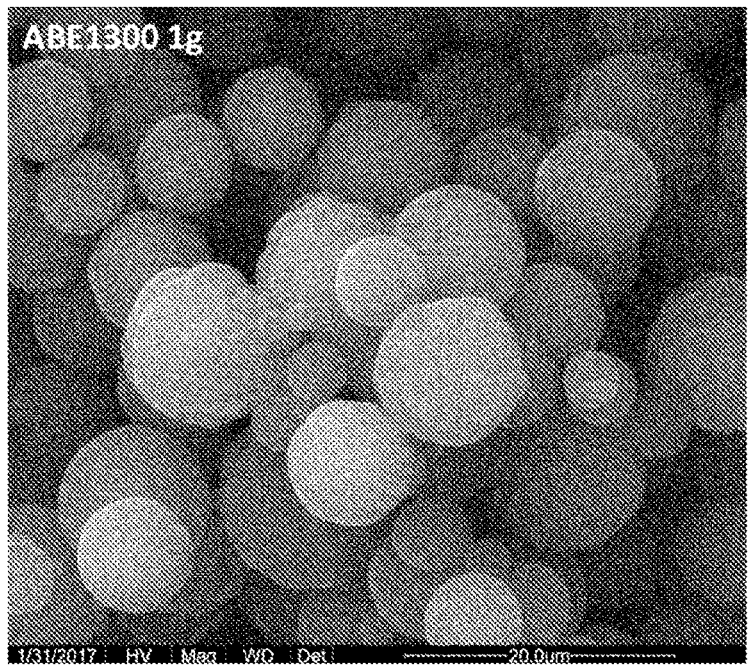
FIG. 2 is an image obtained by SEM of a carbon according to the ABE 1300 invention (scale 20 µm).
Figure 3:
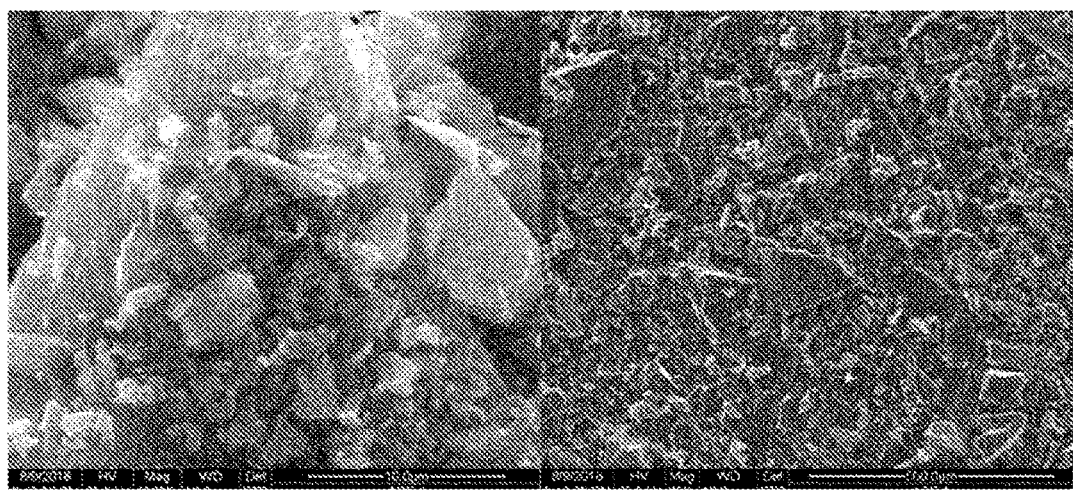
FIG. 3 is an SEM image of a known carbon, HC-water.
Figure 4A:
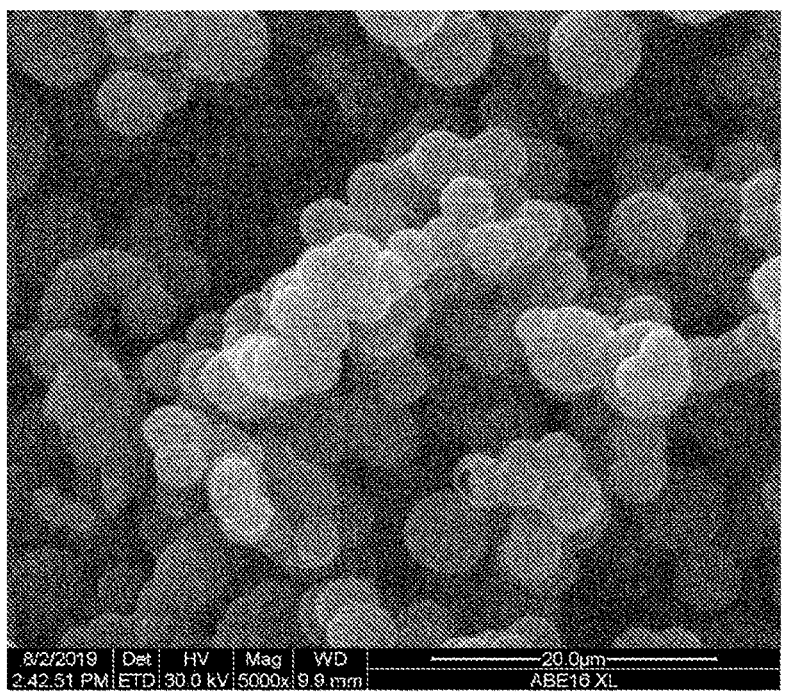
FIG. 4a is an image obtained by carbon SEM according to the ABE 1300 invention that also comprises a graph 4b showing the distribution of the particles.
Figure 4B:
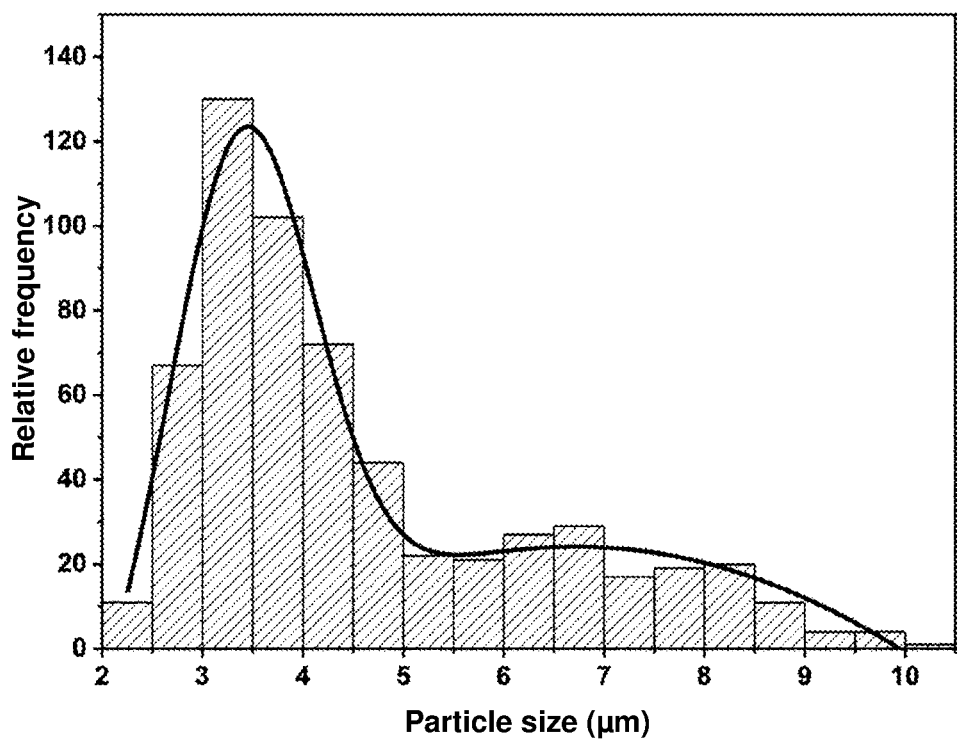
Figure 5A:
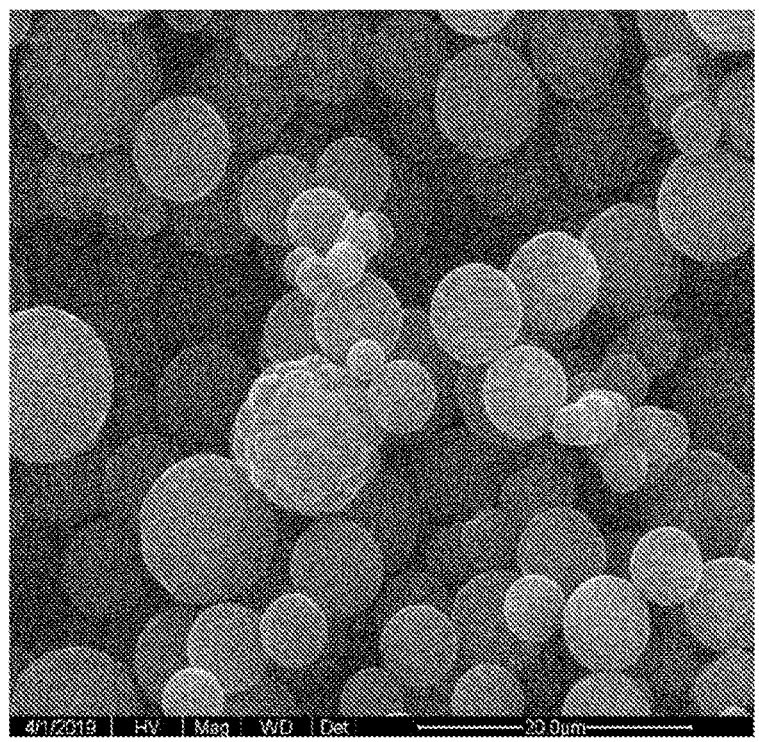
FIG. 5b is an image obtained by SEM of a carbon according to the invention obtained using the same method as ABE 1300, but without a thermal step at 80° C., and which also comprises a graph 5a showing the distribution of the particles.
Figure 5B:
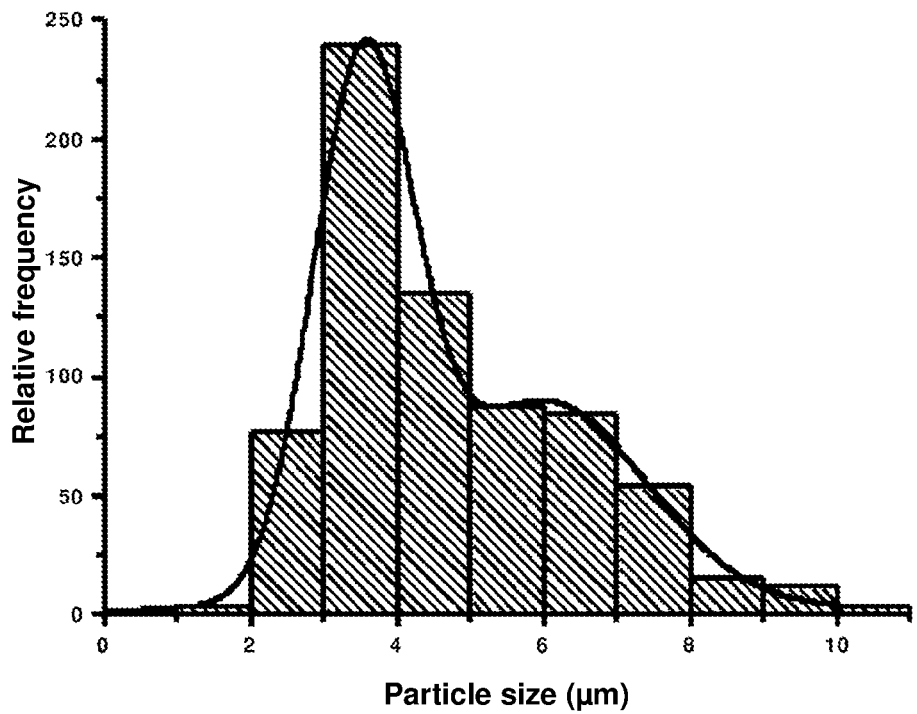

The results of these measurements are compiled in particular in the comparative table below as well as in FIGS. 2 and 3.

TABLE 1

| Names | TT (° C.) | $d_{002}$ (Å) | $S_{BET} N_2$ ($m^2/g$) | $S_{BET} CO_2$ ($m^2/g$) | COx (mmol/g) | ASA ($m^2/g$) | Morphology | Particle size (μm) |
|---|---|---|---|---|---|---|---|---|
| ABE 1300 | 1300 | 3.90 | 2.7 | 60.0 | 0.36 | 11.9 | spheres | 3.5/7.5 |
| ABE 1400 | 1400 | 3.88 | 7.0 | 20.4 | 0.11 | 3.3 | spheres | 3.9/7.5 |
| ABE 1500 | 1500 | 3.80 | 3.5 | 6.4 | 0.046 | 1.2 | spheres | 3.4/7.0 |
| ABE 1600 | 1600 | 3.77 | 6.1 | 9.1 | 0.044 | 1.3 | spheres | 3.5/7.7 |
| MC-00-1500 | 1500 | 3.73 | 8.5 | 9.2 | 0.15 | 5.8 | spheres | 2.3 |
| MG-00-1500 | 1500 | 3.75 | 6.0 | 14.6 | 0.13 | 4.3 | spheres | 4.2 |
| C-00-1500 | 1500 | 3.67 | 11.2 | 17.4 | 0.22 | 6.5 | spheres | 0.45 |
| MG-00-EG-1500 | 1500 | 3.75 | 6.5 | 10.5 | 0.12 | 4.8 | spheres | 3.7 |
| MG-00-EG-1600 | 1600 | 3.72 | 6.8 | 13.3- | 0.09 | 3.2 | spheres | 3.8 |
| PAC2 | — | 3.75 | 3.8 | 3.6 | 0.07 | 6.4 | random | 9 |
| HC-water | 1300 | 4.00 | 72 | 220 | 0.21 | 8.4 | random | 5-200 |
| PR-600 | 600 | 4.00 | 450 | — | 5.66 | — | spheres | 2-6 |
| PR-1200 | 1200 | 3.88 | 30 | 394 | 0.86 | 24 | random | 30-200 |
| PR-1500 | 1500 | 3.72 | 58 | 139 | 0.64 | 17 | random | 30-200 |

TT—Heat treatment temperature; $d_{002}$—interlayer distance determined by XRD; $S_{BET} N_2$ and $S_{BET} CO_2$-BET surfaces determined by $N_2$ and $CO_2$ adsorption; $CO_x$—quantity of oxygen-based functional groups assessed by TPD-MS; ASA—active surface area obtained by oxygen chemisorption and TPD-MS; Size of the particles obtained by the SEM technique.

The hard carbon according to the invention has a spherical and relatively uniform morphology, which allows it to be distinguished from the hard carbons currently available. As is clear when comparing the morphologies of a hard carbon according to the invention and a known hard carbon, which are respectively shown in FIGS. 2 and 3, a hard carbon of known type (Beda et al., and Irisarri et al.) exhibits heterogeneous and random, non-spherical particle morphology with very large sizes (up to 200 μm). The hard carbon according to the invention not only has a spherical and uniform morphology of these particles, but also preferably a uniformity of size. Finally, this mean particle size is advantageously smaller (<10 µm).

The hard carbon according to the invention is also very different from known spherical amorphous carbons such as PR 600 carbon (Maetz et al.). The hard carbon according to the invention is also a non-porous carbon, that is to say, a carbon having a small total pore volume, or even a low specific surface area, and in particular having a BET N2 specific surface area of less than 100 m²/g. Another advantageous characteristic is a small quantity of oxygenated functions (COx) at the surface of the material.

Table 2 below highlights other differences between the type of hard carbon according to the invention ABE 1300 and the porous carbon PR600.

TABLE 2

| Parameter | PR600 | ABE 1300 |
|---|---|---|
| Surface chemistry composition* | Nitrogen-doped carbon (3-4% N, 8% O, 88% C) | Carbon without nitrogen (97% C and 3% O) |
| Density** | 1.6 g/cm³ | 2.1 g/cm³ |

*measured by XPS:

X-ray photoelectron spectroscopy (XPS) was performed with a VG SCIENTA SES-2002 spectrometer equipped with a concentric hemispherical analyzer. The incident radiation used was generated by a monochromatic Al Ka (1486.6 eV) X-ray source operating at 420 W (14 kV; 30 mA). The broad sweep spectrum signal was recorded with a pass energy of 500 eV.

** Measured by gas pycnometer: Model: Accupyc 1330™ from Micromeritics, under He. Procedure: 20 purges with 5 repetitions on a 1 mL cell filled to ¾.

Example 3: Effect of the Thermopolymerization Step

Using a thermopolymerization step makes it possible to obtain different distributions in terms of average particle sizes. A carbon material according to the invention was obtained by carrying out a synthesis identical to those of example 1 having a thermal step at 1300° C., but where the thermopolymerization step was replaced by a drying step (or simple polymerization by standing) at 25° C. The results are shown in FIGS. 4a and 4b and 5a and 5b, which show a typical distribution for the material without a thermal step (FIGS. 5a and 5b) with a peak for an average size at around 3.5 µm, 6.5 µm and a more complex distribution with two distinct peaks of average particle sizes at 3.5 µm and 7.4 µm. Such a heterogeneous distribution can be advantageous for the porosity of the electrode. The particle size of these materials was measured using the SEM images and the ImageJ software, which was used to determine the average particle size. Several SEM images were analyzed and approximately 700 to 1000 particles counted in order to produce a particle size distribution histogram.

Example 3Bis

Figure 16:
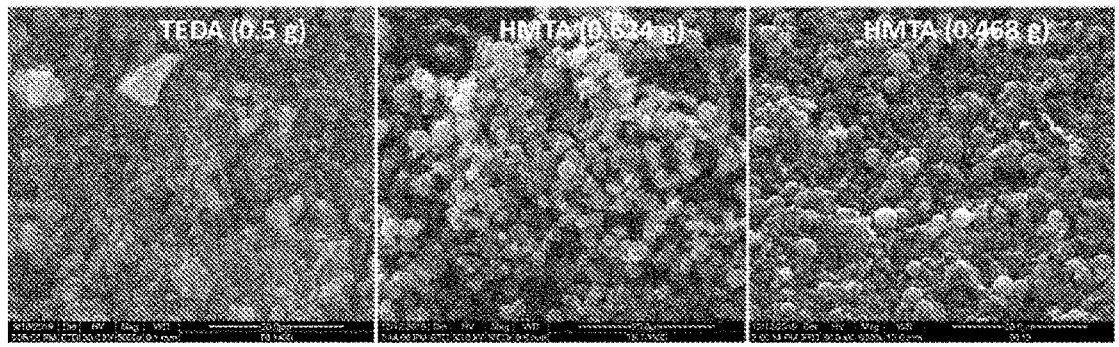
FIG. 16 shows images obtained by SEM of carbons according to the invention, obtained using the method described in example 3bis.

The effect of the TEDA vs. HMTA catalyst was analyzed using Mimosa-C as precursor or aromatic hydroxyl compound. The method according to the invention described in Example 1 for Mimosa-C was replicated the use; either of 0.5 g of TEDA or of 0.624 g of HMTA. 1 g of precursor, i.e. Mimosa-C, and 1.2 g of glyoxylic acid were dissolved in 40 mL (g) of water with mechanical stirring (~30 min) at ambient temperature (25° C.) in a flask. Then, TEDA or HMTA was added to this mixture and it was stirred for about 5-10 min until completely dissolved. It has been observed that the polymer yield recovered after the solid/liquid separation phase is substantially improved (from 33% to 82%) when HTMA is used instead of TEDA. Moreover, as shown in FIG. 16, the morphology obtained in the presence of HMTA is better defined and the particle size is larger. Finally, using a larger quantity of HMTA (0.624 g vs. 0.468 g) makes it possible to obtain better uniformity.

Figure 17:
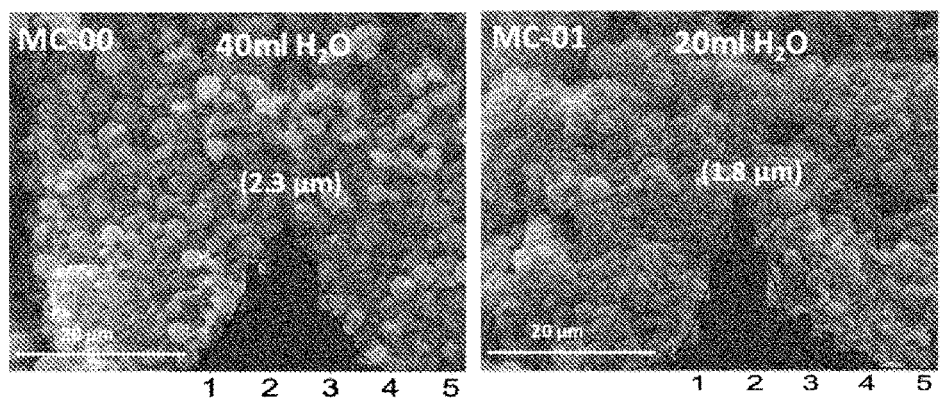
FIG. 17 is an image obtained by SEM of the carbons according to the invention MC-00 and MC-01 and which also comprise a graph showing the distribution of the particles.

Using the synthesis described in this example with 0.624 g of HDTMA, the impact of varying the amount of water and glycolic acid as well as the resting time, or maturation, was studied. These data are presented in Tables A, B and C and in FIGS. 17, 18 and 19.

TABLE A

| Sample | MC-00 | MC-01 |
|---|---|---|
| Mimosa-C | 1 g | 1 g |
| Glyoxylic acid | 1.2 g | 1.2 g |
| H₂O | 40 mL | 20 mL |
| HMTA | 0.624 g | 0.624 g |
| Mixing during the maturation phase | No | No |
| Maturation time | 48 hours | 48 hours |
| Polymer mass | 0.82 g | 1.02 g |
| Morphology | Spheres (2.3 µm) | Spheres (1.8 µm) |
| Carbon yield | 30% | 45% |

Reducing the amount of water has an advantageous effect on the carbon yield according to the invention. It is also noted that the particle size decreases (cf. FIG. 17).

TABLE B

| Sample | MC-04 | MC-00 | MC-05 |
|---|---|---|---|
| Mimosa-C | 1 g | 1 g | 1 g |
| Glyoxylic acid | 0.6 g | 1-2 g | 1.8 g |
| H₂O | 40 mL | 40 mL | 40 mL |
| HMTA | 0.624 g | 0.624 g | 0.624 g |
| Mixing during the maturation phase | No | No | No |
| Maturation time | 48 hours | 48 hours | 48 hours |
| Polymer mass | — | 0.8201 g | 0.9809 |
| Morphology | Spheres (1.5 µm) | Spheres (2.3 µm) | Spheres (1.9 µm) |
| Carbon yield | 34% | 30% | 43% |

Figure 18:
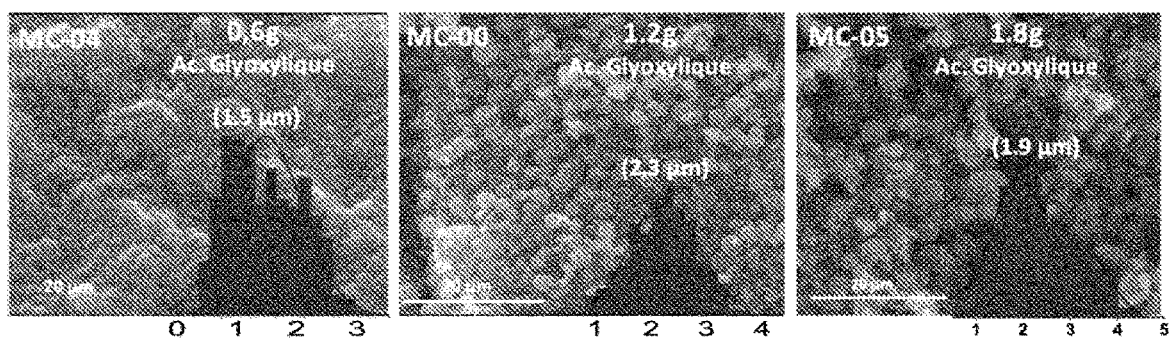
FIG. 18 is an image obtained by SEM of the carbons according to the invention MC-00, MC-04 and MC-05 and which also comprise a graph showing the distribution of the particles.

A decrease in the amount of glyoxylic acid appears to reduce the particle size (cf. FIG. 18).

TABLE C

| Sample | MC-0524 | MC-05 | MC-0572 | MC-0597 |
|---|---|---|---|---|
| Precursor | Mimosa-C | Mimosa-C | Mimosa-C | Mimosa-C |
| Mass | 1 g | 1 g | 1 g | 1 g |
| Glyoxylic acid | 1.8 g | 1.8 g | 1.8 g | 1.8 g |
| H₂O | 40 mL | 40 mL | 40 mL | 40 mL |
| HMTA | 0.624 g | 0.624 g | 0.624 g | 0.624 g |
| Mixture | No | No | No | No |
| Maturation time | 24 h | 48 h | 72 h | 97 h |
| Morphology | Spheres (1.8 gm) | Spheres (1.9 µm) | Spheres (2.4 µm) | Spheres (2.2 µm) |
| Carbon yield | 26.0% | 44.0% | 47.0% | 51.0% |

Figure 19:
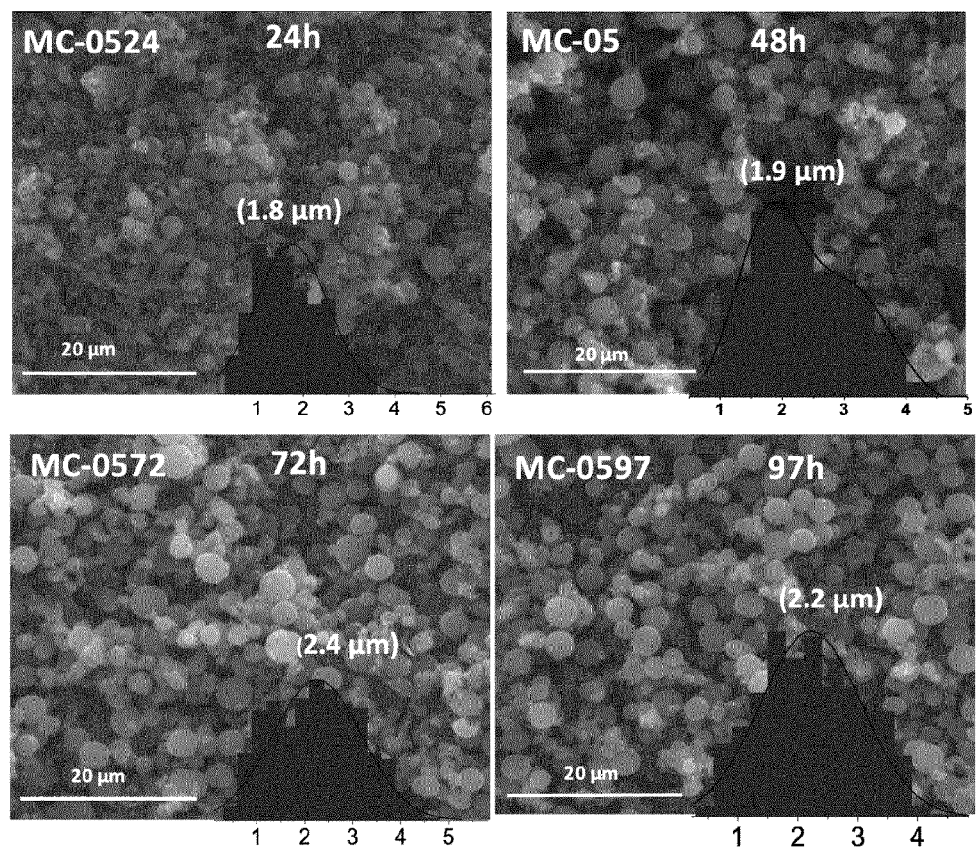
FIG. 19 is an image obtained by SEM of the carbons according to the invention MC-0524, MC-05, MC-0572 and MC-0597 and which also comprise a graph showing the distribution of the particles.

The rest time appears to be optimized around 48 hours, as an increase in this duration only allows a small increase in the size of the spheres (see FIG. 19).

Example 4: Examples of Electrochemical Devices According to the Invention and Comparative Data with a Material of the Prior Art (PAC2)

Figure 6:
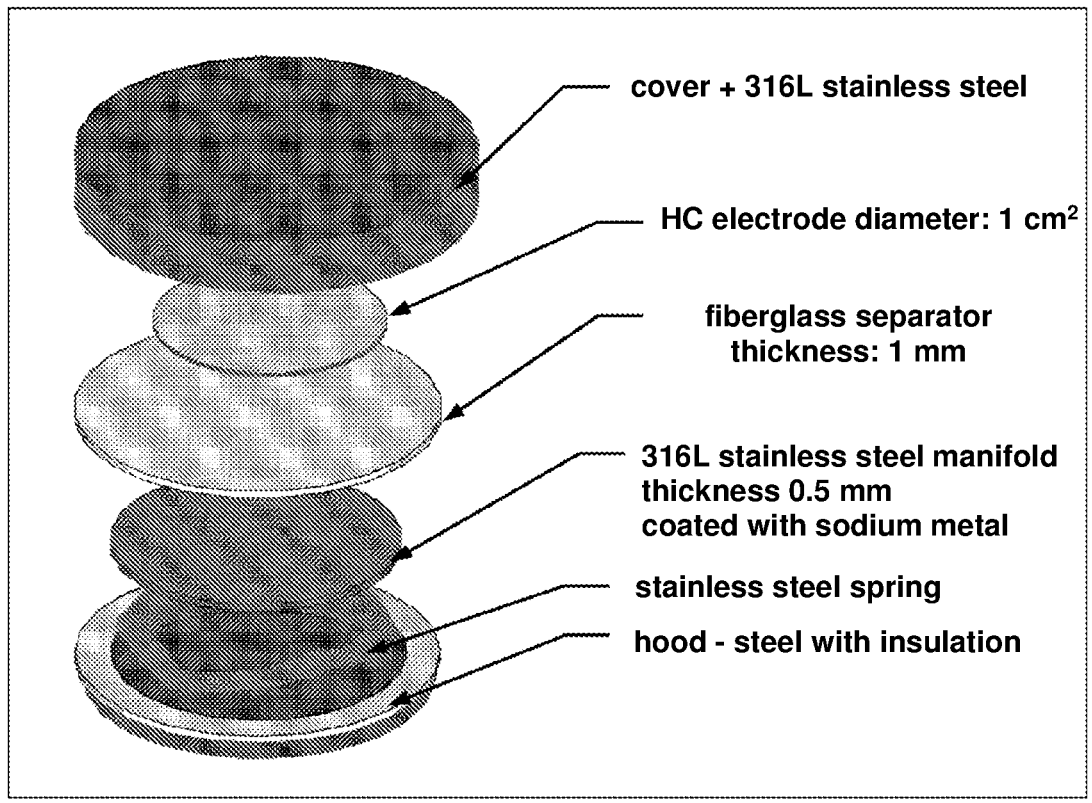
FIG. 6 is an exploded view of the assembly of a half-cell configuration according to the invention.

Button-type electrochemical cells were assembled according to the diagram in FIG. 6.

Electrodes according to the invention are manufactured by mixing:
94% by mass of a hard carbon according to the invention ABE 1300, ABE 1400, ABE 1500 and ABE 1600;
3% by mass carbon black as conductive additive (C45 from the company Imerys, Paris, FR); and
3% by weight poly(vinylidene fluoride) (PVdF), PVDF 5130 or SOLEF from SOLVAY, as polymer binder; in the mortar for 5 minutes.

≈1 g of dispersed powder is placed in a vial with a magnetic bar. ≈1 g of solvent/V-methyl-2-pyrrolidone (NMP) (CAS No. 872-50-4) is added and the mixture is dispersed for 12 hours at 300 rpm at 25° C. The liquid, or ink, thus obtained is deposited by coating on an aluminum collector (from RJC HOLDINGS CORPORATION in Incheon City, South Korea). The ink layer is dried for 2 hours at 60° C. under air flow. The films thus obtained have a thickness comprised between 130 µm and 160 µm (collector included) and a mass varying between 7.5-10.2 mg/cm² of active material. The films are then calendered by successive passage between 2 remote rollers of increasingly smaller size until a film is obtained, the thickness of which remains unchanged regardless of the pressure applied to the film. The films are then pelleted to obtain circular electrodes of 1 cm² for the batteries cycling vs. Na and of 1.327 cm² for those cycling vs. NVPF. The electrodes are then dried in an oven at 70° C. for 2 hours, as are the various parts of the button cell assembly.

For full-cell devices, the NVPF electrodes are obtained by mixing:
92% by mass NVPF produced by the LRCS in Amiens
4% by mass carbon black as conductive additive (C45 from Imerys, Paris, FR); and
4% by mass poly(vinylidene fluoride) (PVDF), PVDF 5130 or SOLEF from SOLVAY, as polymer binder; in the mortar for 5 minutes.

~1 g of dispersed powder is placed in a vial with a magnetic bar. ~1 g of N-methyl-2-pyrrolidone (NMP) (CAS No. 872-50-4) is added and the mixture is dispersed for 12 hours at 300 rpm at 25° C. The liquid, or ink, thus obtained is deposited by coating on a 22 µm aluminum collector (from RJC HOLDINGS CORPORATION in Incheon City, South Korea). The ink layer is dried for 2 hours at 60° C. under air flow. The films thus obtained have a thickness comprised between 140 µm and 200 µm (collector included) and a mass varying between 15-20 mg/cm² of active material.

The films are then calendered by successive passage between 2 remote rollers of increasingly smaller size until a film is obtained, the thickness of which remains unchanged regardless of the pressure applied to the film. The films are pelleted to obtain circular electrodes of 1.327 cm². The electrodes are then dried in an oven at 70° C. for 2 hours, as are the various parts of the button cell assembly. The electrodes comprising ABE 1400, 1500 and 1600 material were combined with sodium metal (to form a half-element or half-cell configuration). The electrode comprising ABE 1300 material was associated with an electrode based on sodium vanadium (III) fluorophosphate (NVPF), to constitute a full-cell configuration.

Figure 8:
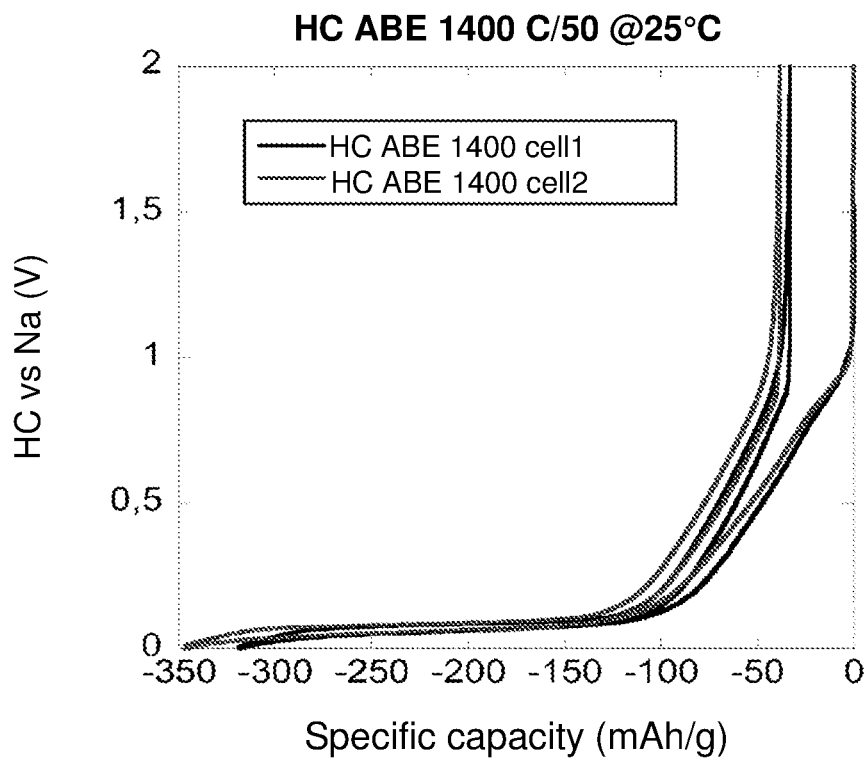
FIG. 8 shows the performance of the half-cell using the ABE 1400 material according to the invention, C/50 at 25° C.
Figure 9:
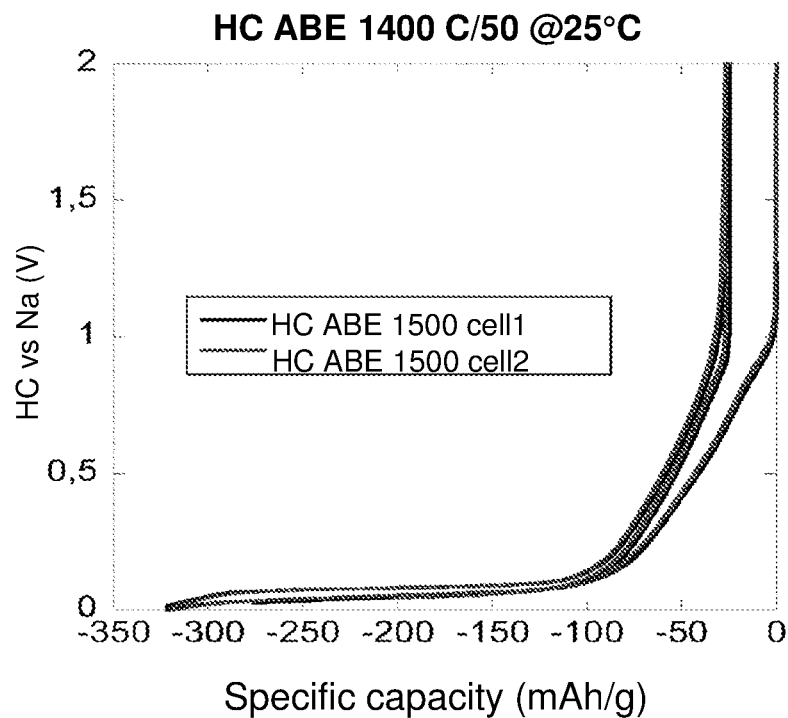
FIG. 9 shows the performance of the half-cell using the ABE 1500 material according to the invention, C/50 at 25° C.
Figure 10:
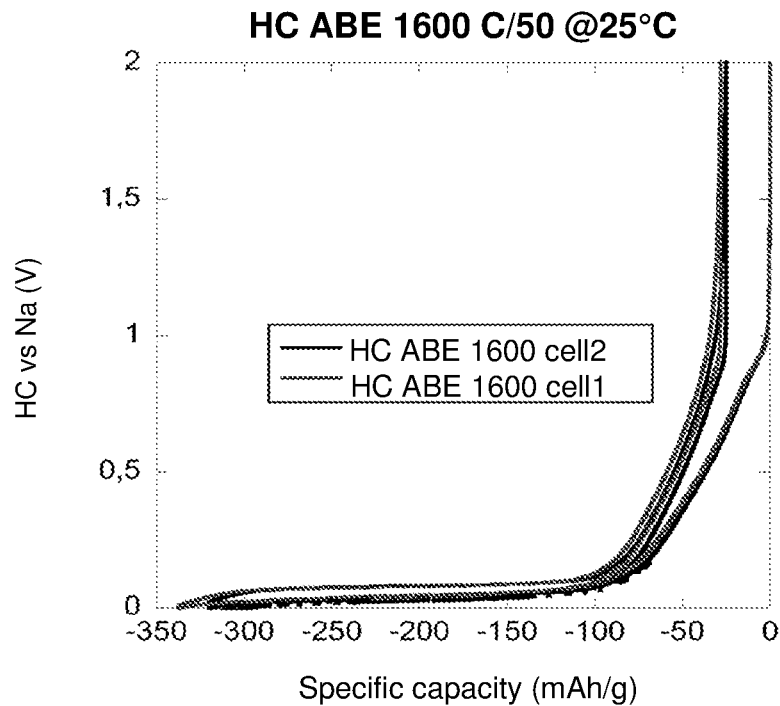
FIG. 10 shows the performance of the half-cell using the ABE 1600 material according to the invention, C/50 at 25° C.
Figure 11:
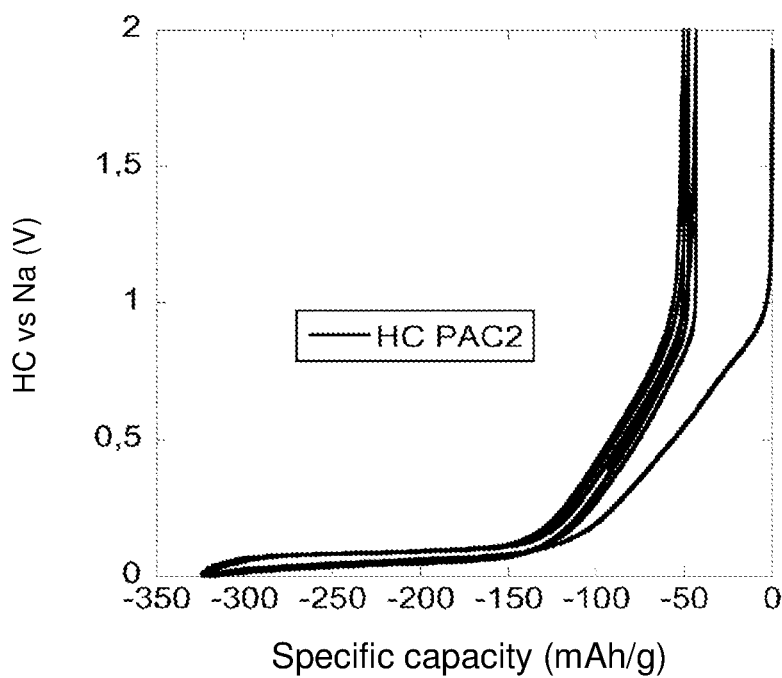
FIG. 11 shows the performance of the half-cell using a hard carbon PAC2 C/50 at 25° C.

The elements of the half-element device are shown in FIG. 6. With the exception of the electrodes, they come from the company INNOV' METOR, FERRIERES EN GATINAIS, FR. A stainless steel spring 6 is positioned in a lower part 2 of a steel cover and inside an insulating ring 4. A current collector 8 made of 316L stainless steel and 0.5 mm thick is positioned on the circular spring. This collector 8 is a disc with a diameter of about 15 mm covered with sodium metal. Sodium metal was spread over the entire upper surface of collector 8, then scraped off with a spatula in order to obtain a clean surface, free of metal oxides. A separator disc 10 made of fiberglass, 1 mm thick and 16 mm in diameter, is positioned on the metal sodium surface. 200 µL of electrolyte is then added. This electrolyte is a mixture of ethyl carbonate (EC) and dimethyl carbonate (DMC) in proportions (1:1% mass mixture, to which the NaPF$_6$ salt is added in proportions of 1 mol/L. Then an electrode 12 made from hard carbon as described above is positioned on the separator 10. Finally, the upper part 14 of the stainless steel cover is positioned to encapsulate the electrode 12, and the two parts of the cover 2 and 14 are secured together (for example, crimped). In this device, the electrode 12 is in the cathode position and the sodium metal is in the anode position. This device is produced under argon in a glove box. The electrochemical cell is left to rest for 2 hours before the first cycle. The characteristics of the device are then measured by galvanostatic cycling at C/50 in discharge and in charge with a rest of 1 min between 2 modes. Two half-cells (CELL 1 and CELL 2) were studied, and as the results show in FIGS. 8 to 10, the curves obtained are identical. Specific capacity values were acquired when the variation in potential reached 10 mV compared to the previous acquisition and/or every 5 seconds. In this way, it is possible to know the specific capacity with precision.

Figure 7:
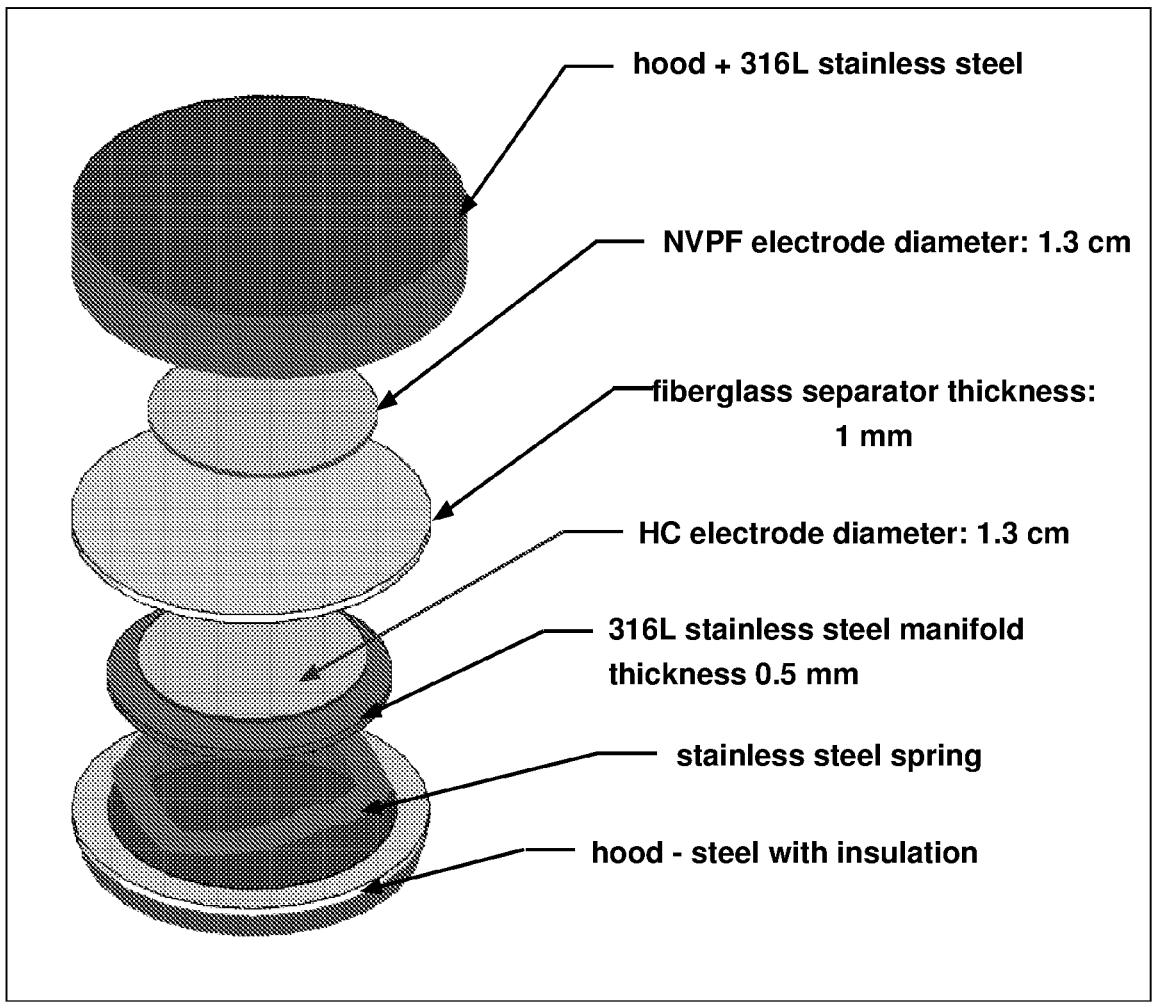
FIG. 7 is an exploded view of the assembly of a configuration of a battery according to the invention.

The full-cell elements of the device are shown in FIG. 7. With the exception of the electrodes, they come from the company INNOV' METOR, FERRIERES EN GATINAIS, FR. A stainless steel spring 106 is positioned in a lower part 102 of a steel cover and inside an insulating ring 104. A current collector 108 made of 316L stainless steel and 0.5 mm thick is positioned on the circular spring. This collector 108 is a disc with a diameter of approximately 15 mm on which an electrode 112 is positioned comprising a material according to the ABE 1300 invention. The electrode 112 adopts the form of a disc 1.3 cm in diameter and about 110 µm (collector included) thick. A separator disc 110 made of fiberglass, 1 mm thick and 6 mm in diameter, is positioned on the electrode 112. 200 µL of electrolyte is then added. This electrolyte is a mixture of ethyl carbonate (EC) and dimethyl carbonate (DMC) in proportions (1:1% by mass), mixture to which NaPF6 is added in proportions of 1 mol/L. Then, an NVPF electrode 109 with a diameter of 1.3 cm as described above is positioned on the separator 110. Finally, the upper part 114 of the stainless steel cover is positioned to encapsulate the electrodes 112 and 109 and the two parts of the cover 102 and 114 are secured together (for example, crimped). In this device, the electrode 112 constitutes the anode and the electrode 109 constitutes the cathode. This device is produced under argon in a glove box. The electrochemical cell is left to rest for 2 hours before the first cycle.

The mass ratio between the mass of NVPF and the material ABE 1300, NVPF/ABE1300 varies between 2 and 2.5.

Figure 12:
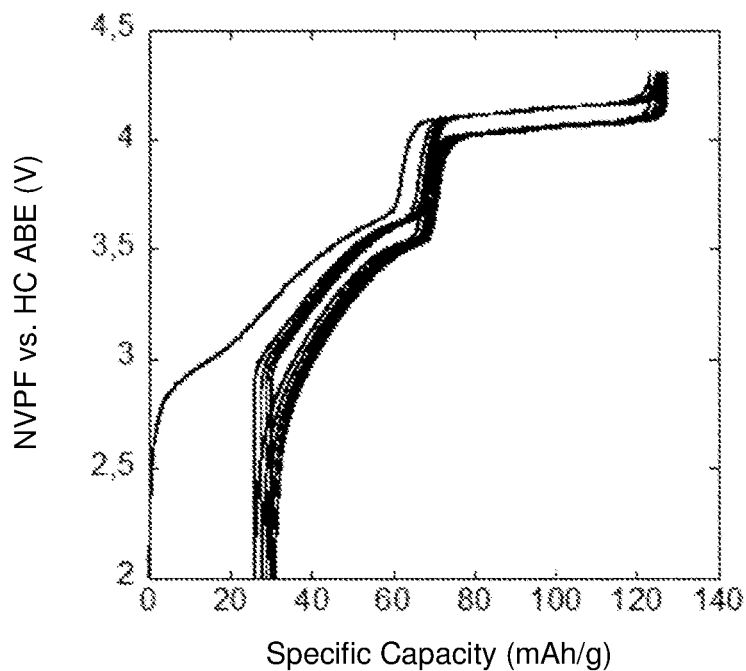
FIG. 12 shows the pace of the galvanostatic cycling of the complete cell produced with the ABE 1300 material during formation at C5 & D5
Figure 13:
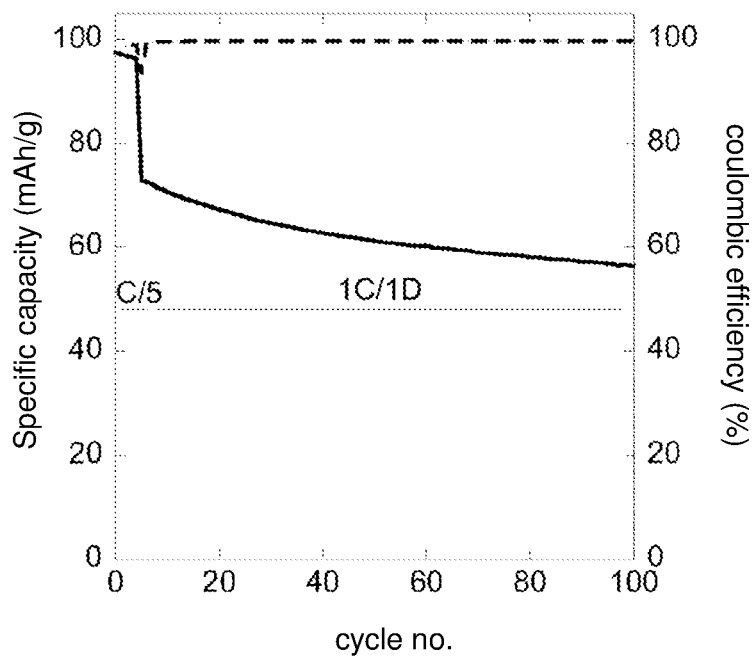
FIG. 13 shows the retention of the complete cell made with the ABE 1300 material in galvanostatic mode (C5 & D5 formation over 5 cycles then 1C & 1D over 100 cycles)

The variation of specific capacity as a function of voltage is shown in FIGS. 12 and 13 and was measured as follows:

Retention Cycle:
  Formation: galvanostatic cycling over 5 cycles at C/5 & D/5 at 25° C. with a 5 min rest
  Retention: galvanostatic cycling at 1C & 1D at 25° C. with a 5 min rest.

Figure 14:
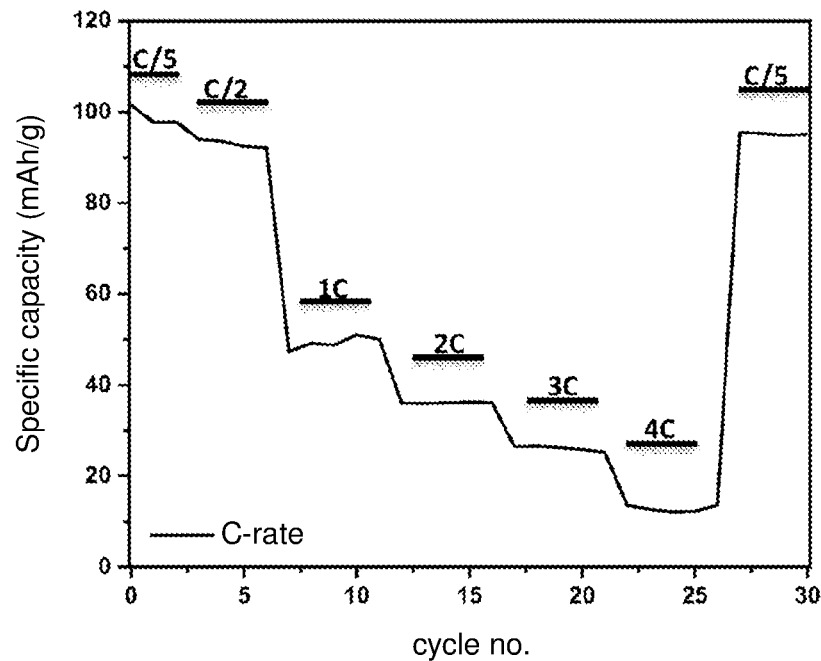
FIG. 14 shows the retention of the complete cell made with the ABE 1300 material in galvanostatic mode at different charging regimes and with a constant discharge regime
Figure 15:
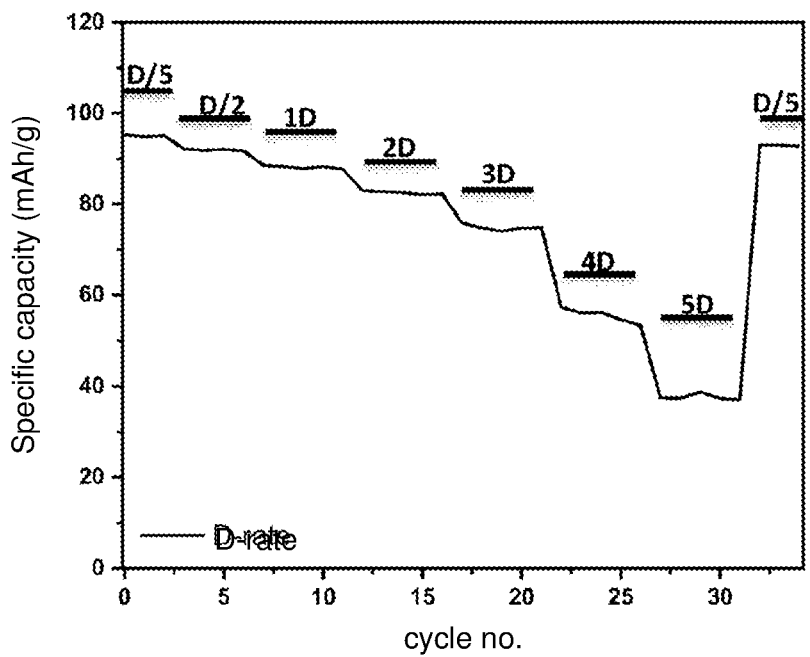
FIG. 15 shows the retention of the complete cell made with the ABE 1300 material in galvanostatic mode at different discharge regimes and with a constant charging regime.

The specific capacities of the cell were measured as follows:

The specific capacities as a function of the applied speed (at different currents) make it possible to obtain important information on the performance of the cells in power, for example with a view to addressing certain industrial applications shown in FIGS. 14 and 15.

Power Cycling:
  Formation: galvanostatic cycling over 5 cycles at C/5 & D/5 at 25° C. with a 5 min rest
  Crate: galvanostatic cycling at variable charge over 5 cycles: from C/5 to 4C and at constant discharge: D/5 at 25° C. with a 5 min rest
  Drate: galvanostatic cycling at constant charge: C/5 & at variable charge over 5 cycles: from D/5 to 4D at 25° C. with a 5 min rest The specific capacity of the cell is high (about 125 mAh*g$^{-1}$). The specific discharge capacity corresponds to 80% of the charge capacity, which corresponds to an initial irreversible capacity of 25 mAh g$^{-1}$, when it is cycled at a rate C/5. This loss of capacity is due to the irreversibility of the electrode with the greatest irreversibility, i.e. hard carbon (irreversibility of NVPF: 10%). The capacity decreases to ~75 mAh g$^{-1}$ when cycled at 1C/1D. When evaluating the rate (current variation) on the capacity, it was found that the cycling rate used during the charge/discharge step (insertion/extraction of Na+ into/from the hard carbon anode) is essential for good performance. If a low enough current is used to charge the cell, even high discharge rates (3D) end up giving good performance (~80% retention capacity). On the contrary, when a fast charge rate is used (i.e. 1C), low efficiency is obtained even if the discharge current applied is low (i.e. D/5).

Porosity, COx functional groups and structural defects quantified by ASA have a significant impact on the initial irreversible capacity. The irreversible capacity decreases with decreasing structural defects (ASA) and with decreasing COx groups. Moreover, the irreversible capacity decreases with the increase in the tapped density.

Table 3 below compiles the characteristics of carbon materials according to the invention and those of the cells comprising them, as well as the characteristics of a prior art material PAC2 and of a cell comprising it as described above.

TABLE 3

| Carbon material | Density He (g/cm$^3$) | Tapped density g/cm$^3$ | Porosity after pelleting (%) | Cirrev (%) | $Q_{iD}$ (mAh g$^{-1}$) | $Q_{ic}$ (mAh g$^{-1}$) |
|---|---|---|---|---|---|---|
| PAC2* | 1.954 | 0.96 | 46 | 14 | 323 | 278 |
| ABE 1300 | 2.107 | 0.71 | 62 | 11 | 341 | 303 |
| ABE 1400 | 2.163 | 0.74 | 54 | 11 | 346 | 307 |
| ABE 1500 | 1.875 | 0.84 | 46 | 8 | 320 | 294 |
| ABE 1600 | 1.633 | 0.72 | 41 | 8 | 337 | 309 |
| MC-00-1500 | 2.10 | 0.73 | 58 | 15 | 374 | 315 |
| MG-00-1500 | 2.05 | 0.73 | 56 | 15 | 385 | 329 |
| C-00-1500 | 1.97 | 0.71 | 58 | 18 | 354 | 286 |
| MG-00-EG-1500 | 2.12 | 0.67 | 64 | 17 | 403 | 334 |
| MG-00-EG-1600 | 1.85 | 0.70 | 49 | 13 | 366 | 317 |
| PR1200 | / | 0.7 | / | / | / | / |
| PR1500 | / | 0.7 | / | / | / | / |

Cirrev=irreversible capacity; $Q_{iD}$=initial discharge capacity, $Q_{iC}$=initial charge capacity.

The materials according to the invention have a significant advantage in terms of initial irreversible capacity, which capacity is lower compared to other similar hard carbon materials.

The invention claimed is:

1. A carbon material comprising particles of hard, non-porous carbon having a spherical morphology, this material having an interlayer distance $d_{002}$ greater than 3.6 Å, a total specific surface area, measured by the BET N2 method, of less than 75 m$^2$/g and a total specific surface area, measured by the BET $CO_2$ method, of 1 to 100 m$^2$/g.

2. The carbon material according to claim 1, wherein the interlayer distance is between 3.70 Å and 4.00 Å.

3. The carbon material according to claim 1, wherein said total specific surface area, measured by the BET $CO_2$ method, is from 1 to 50 m$^2$/g.

4. The carbon material according to claim 1, wherein said material has a tapped density greater than 0.7 g/cm$^3$.

5. The carbon material according to claim 1, said material having an active surface area (ASA) of less than 12 m$^2$/g.

6. The carbon material according to claim 1, said material having an oxygen-based functional group content of less than 0.5 mmol/g.

7. The carbon material according to claim 1, wherein the particles have a size between 0 μm and 15 μm.

8. A method for manufacturing a hard non-porous carbon material of claim 1 comprising at least the following steps:
  a) mixing, in the presence of a polar protic solvent, at least:
    an amine catalyst selected from the group consisting of triethylenediamine, quinuclidine, triethylamine (TEA), HMTA (hexamethylenetetramine) and mixtures thereof;
    an aromatic hydroxyl compound selected from the group consisting of phenol, resorcinol and phloroglucinol, catechin, pyrogallol, hydroxyquinol, gallic acid, polyphenols, such as tannins, and mixtures thereof; and
    an aldehyde compound, selected from the group consisting of glyoxal, formaldehyde, acetaldehyde, a keto acid, glyoxylic acid, pyruvic acid, 2-methyl-3-oxopropanoic acid, and mixtures thereof;
  b) maturing the mixture obtained at the end of step a), at a temperature comprised between 2° and 35° C., for a period comprised between 0.5 and 5 days, making it possible to obtain a solid phase comprising spheres of phenolic resin and a liquid phase;
  c) controllably separating said solid phase from said liquid phase;
  d) polymerizing and/or drying the solid phase for a period of 1 to 48 hours resulting in the formation of a dry phenolic resin;
  e) carbonizing the dry phenolic resin in the presence of a flow of inert gas at a temperature between 1200° C. and 2000° C. to obtain a hard, non-porous carbon material; and f) optionally a step of recovering the hard, non-porous carbon material.

9. The method according to claim 8, wherein the polymerization step is a thermal step, comprising heating to a temperature of 70° C. to 150° C.

10. The method according to claim 9, wherein the amine catalyst is triethylenediamine, the aromatic hydroxyl compound is phloroglucinol or a condensed tannin; and wherein the aldehyde compound is glyoxylic acid.

11. The method according to claim 8, wherein the maturation step b) is carried out in the absence of stirring.

12. The method according to claim 8, wherein the separation step c) is carried out without centrifugation.

13. A carbon material obtained according to claim 8.

14. An electrode comprising a carbon material as described in claim 1.

15. The carbon material of claim 1 wherein the total specific surface area measured by the BET CO2 method is 1 to 60 $m^2/g$.

16. The carbon material of claim 2 wherein the interlayer distance is between 3.75 Å to 3.90 Å.

17. The carbon material of claim 3 wherein the total specific surface area, measured by the BET CO2, method is 1 to 10 $m^2/g$.

18. The carbon material of claim 4 wherein the tapped density is within the range of 0.72 $g/cm^3$ to 1.1 $g/cm^3$.

19. The carbon material of claim 5 wherein the active surface area is less than 5 $m^2/g$.

20. The carbon material of claim 6 wherein the content of the oxygen-based functional group is less than 0.1 mmol/g.

21. The carbon material of claim 6 wherein the size of the particles is between 0 µm and 10 µm.

* * * * *